(12) United States Patent
Marubayashi et al.

(10) Patent No.: US 7,140,380 B2
(45) Date of Patent: Nov. 28, 2006

(54) CELL SAFETY VALVE AND CELL HAVING SAME

(75) Inventors: Hironori Marubayashi, Sumoto (JP); Takuma Morishita, Sumoto (JP); Yoshihiro Tobita, Hyogo (JP); Shigeki Fujii, Hyogo (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 116 days.

(21) Appl. No.: 10/322,471

(22) Filed: Dec. 19, 2002

(65) Prior Publication Data

US 2003/0131880 A1    Jul. 17, 2003

(30) Foreign Application Priority Data

Dec. 20, 2001  (JP) ............................. 2001-388314

(51) Int. Cl.
*F16K 17/40*  (2006.01)
*H01M 21/12*  (2006.01)

(52) U.S. Cl. .............................. 137/68.25; 137/68.27; 429/56

(58) Field of Classification Search ............. 137/68.25, 137/68.27; 220/89.2; 429/53, 56
See application file for complete search history.

(56) References Cited

U.S. PATENT DOCUMENTS

| | | | |
|---|---|---|---|
| 4,245,010 A * | 1/1981 | Golz | 429/56 |
| 4,597,505 A * | 7/1986 | Mozley et al. | 220/89.2 |
| 4,610,370 A * | 9/1986 | Patterson et al. | 220/89.2 |
| 4,669,626 A * | 6/1987 | Mozley | 220/89.2 |
| 4,774,155 A * | 9/1988 | Nientiedt et al. | 429/56 |
| 4,842,965 A * | 6/1989 | Urushiwara et al. | 429/56 |
| 5,267,666 A | 12/1993 | Hinrichs et al. | |
| 5,595,835 A * | 1/1997 | Miyamoto et al. | 429/56 |
| 5,741,606 A * | 4/1998 | Mayer et al. | 429/56 |
| 6,257,267 B1 * | 7/2001 | Saijo et al. | 220/89.2 |
| 6,265,097 B1 * | 7/2001 | Konno et al. | 429/56 |
| 6,355,372 B1 * | 3/2002 | Yamahira et al. | 429/56 |
| 6,571,816 B1 * | 6/2003 | Morishita et al. | 137/68.27 |
| 6,589,687 B1 * | 7/2003 | Konno et al. | 429/56 |

FOREIGN PATENT DOCUMENTS

| | | |
|---|---|---|
| JP | 11-273640 | 10/1999 |
| JP | 2000-348700 | 12/2000 |
| JP | 2001-325934 | 11/2001 |
| TW | 424941 | 3/2001 |

* cited by examiner

*Primary Examiner*—John Rivell
(74) *Attorney, Agent, or Firm*—Westerman, Hattori, Daniels & Adrian, LLP.

(57) ABSTRACT

A cell according to the present invention comprises a positive electrode, a negative electrode, an electrolyte solution, and an outer casing, wherein the outer casing comprises a valve plate 30 having a thickness, an annular-shaped break groove 4 formed on the valve plate, and one or more of break aiding grooves 1 in the inner area of the break groove, and wherein the break aiding groove comprises such configurations that remaining thickness of the valve plate at the break aiding groove is thicker than remaining thickness of the valve plate at the break groove, and at least one end of the break aiding groove is connected with the break groove. In a cell provided with a valve plate which is a safety valve 9 comprising the break groove and the break aiding groove, the safety valve operates smoothly and releases a gas inside the cell quickly, and resistance to dropping impact is improved.

9 Claims, 39 Drawing Sheets

CELL SAFETY VALVE AND CELL HAVING SAME

BACKGROUND OF THE INVENTION (1) Field of the Invention

The present invention relates to a cell safety valve that releases a gas inside a cell to the outside of the cell when an internal pressure of the cell exceeds a predetermined value. The present invention also relates to a cell having the cell safety valve.

(2) Description of the Prior Art

These days, non-aqueous electrolyte cells are attracting attention as being capable of improving capacity. The non-aqueous electrolyte cell uses, as the positive electrode material, a lithium-containing composite oxide such as $LiCoO_2$ or $LiMn_2O_4$ and uses, as the negative electrode material, a lithium-aluminum alloy and a carbon material that are capable of intercalating and deintercalating lithium ions.

When such a non-aqueous electrolyte cell is mishandled, e.g., put in fire, charged or discharged under abnormal conditions, a great amount of gas may be produced in the cell. In such a case, the gas needs to be released out of the cell quickly. In view of this, the cell is provided with a safety valve for releasing the gas generated abnormally in the cell out of it quickly. Such a safety valve is required to have functions shown as (a)–(c) below.

(a) To operate quickly when an internal cell pressure rises abnormally (at the time of cell abnormality).

(b) To release a gas generated abnormally inside the cell quickly.

(c) Not to operate when dropping impact is applied.

Conventionally, safety valves shown as (I)–(III) below have been proposed.

(I) A cell safety valve wherein a ladder-shaped break groove 51 is formed on a sealing plate 50 and is made to break first at the time of cell abnormality, as described in Japanese Unexamined Patent Application No. 2000-348700 (see FIGS. 16 and 17).

In such a configuration of the safety valve, when an internal cell pressure rises, deformation volume of the periphery of the safety valve is so small that it is difficult for the safety valve to operate when the cell has a small internal pressure, and it is also difficult to control the operating pressure of the safety valve. In addition, the breaking of the safety valve is too small in area to release a gas and therefore speed to release the gas is slow, thus leaving a problem of failing to meet the functions (a) and (b).

(II) A dome-shaped thin valve plate 54 is formed over an opening hole 53 in a sealing plate 50, and a break groove 55 is formed near the periphery of the thin valve plate 54, as described in Japanese Unexamined Patent Application No. 11-273640 (see FIGS. 18 and 19).

Generally, in a safety valve in which a sealing plate is provided with a thin plate portion on which a break groove is formed, when an internal cell pressure rises, the valve plate 54 is deformed by the pressure. This makes it possible for the safety valve to operate at a relatively low pressure. However, in a valve plate having the above-described configuration wherein the break groove 55 is formed at the periphery of the thin valve plate 54, deformation volume at the periphery of the thin valve plate 54 is small. In addition, a stress that the valve plate 54 receives is applied equally on the break groove 55, and it is therefore impossible for the safety valve to operate at a low operating pressure. As a result, cell-to-cell variations in the operating pressure of the safety valve are made large, thus leaving a problem of failing to meet the function (a).

(III) Two dome-shaped dome portions 56 are formed over an opening hole 53 in a sealing plate 50, and break grooves 55·55 to facilitate the breaking of a valve plate are formed at the periphery of the dome portions 56·56 so that the break grooves are adjacent to each other at the substantially center portion of a safety valve, as the present applicants proposed in Japanese Unexamined Patent Application No. 2001-325934 (see FIGS. 20 and 21).

In a safety valve having such a configuration as described above, since the break grooves 55·55 are disposed in the substantially center portion (a portion having large deformation volume) of the valve plate, a stress from an internal cell pressure is concentrated on the center portion. This makes it possible for the safety valve to operate at a low operating pressure and to reduce cell-to-cell variations in the operating pressure of the safety valve. However, when an excessive dropping impact is applied on the center portion of the safety valve that has large deformation volume, it is possible for the break grooves 55·55 to break and thereby cause leakage of an electrolyte solution, thus leaving a problem of failing to meet the above-described function (c).

SUMMARY OF THE INVENTION

In view of the foregoing circumstances, it is an object of the present invention to provide a cell safety valve that operates quickly when an internal cell pressure rises abnormally, releases a gas inside a cell quickly at the time of operation, and does not operate when dropping impact is applied. It is also an object of the present invention to provide a cell having the safety valve.

In order to accomplish the objects of the present invention, there is provided a cell safety valve comprising a valve plate with a thickness, an annular-shaped break groove formed on the valve plate, and a break aiding groove disposed in the inner area of the break groove, wherein the break aiding groove comprises such configurations that the remaining thickness of the valve plate at the break aiding groove is thicker than the remaining thickness of the valve plate at the break groove, and at least one end of the break aiding groove is connected with the break groove.

As used herein the term "safety valve" denotes a safety valve that comprises therein a break groove and a break aiding groove. As described above, when the break aiding groove is formed in the inner area of the annular-shaped break groove to open the valve plate, a stress of the inner area of the break groove to deform results in a stress applied on the break aiding groove when an internal cell pressure rises. Subsequently, since at least one end of the break aiding groove is connected with the break groove, the stress is concentrated on an intersection point of the break aiding groove and the break groove. As a result, when an internal cell pressure abnormally exceeds a predetermined value, the valve plate breaks reliably starting from the intersection point of the break aiding grove and the break groove, and thus the safety valve operates quickly. In addition, since the concentration of the stress on the intersection point of the break aiding groove and the break groove is utilized, cell-to-cell differences in the operating pressure of the safety valve are reduced even if there are slight cell-to-cell variations in the thickness of the valve plate. Accordingly, cell-to-cell variations in operating pressure are reduced. Moreover, in the manufacturing of the valve plate, it is made possible to set a tolerance for cell-to-cell thickness variations of the break groove, and quality control and metal mold adjustment are facilitated, thus increasing productivity.

Further, by forming the break aiding groove on the valve plate, a more accurate safety valve with smaller cell-to-cell variations in operating pressure and which operates at a lower operating pressure is realized, compared with a safety valve described in U.S. Pat. No. 5,267,666 wherein a ridge is formed in addition to a break groove. Note that the term "ridge" represents such a structure that a non-incised surface is angled downwards instead of the structure of the break aiding groove of the present application wherein a surface is incised.

In addition, the intersection point of the break aiding groove and the break groove serves as a point of starting the breaking, and consequently the whole of the break groove breaks, thus enlarging the opening area of the safety valve. Accordingly, it is made possible to quickly release a gas generated abnormally inside the cell.

When dropping impact is applied, a more stress is applied on the break aiding groove formed in the inner area of the break groove than the break groove. However, since the break aiding groove is configured to have a thicker remaining thickness than that of the break groove, the breaking of the break aiding groove is prevented even at the time of receiving impact due to dropping or the like. Therefore, leakage of an electrolyte solution caused by unnecessary operation of the safety valve is eliminated.

The cell safety valve of the present invention may further be such that both ends of the break aiding groove are connected with the break groove.

With the above-described configuration such that the both ends of the break aiding groove are connected with the break groove, two intersection points of the break aiding groove and the break groove on which a stress is concentrated are obtained when an internal cell pressure rises abnormally, thus more smoothly exerting the functions of safety valves.

The cell safety valve of the present invention may further be such that the break aiding groove passes through the center of the safety valve.

The center of the safety valve has the largest deformation volume and if the break aiding groove is present at the center as described above, a stress that the break aiding groove receives resulting from the deformation of the valve plate is made extremely large. Accordingly, since a larger stress is concentrated on each of the intersection points, the valve plate breaks more reliably, thus more quickly exerting the functions of valve plates.

The cell safety valve of the present invention may further be such that among two or more areas of the valve plate divided by the break groove and the break aiding groove, at least one of the areas is dome-shaped.

With the above-described configuration such that at least one of two or more areas which the valve plate is divided into by the break groove and the break aiding groove is dome-shaped, since the whole of the break groove breaks reliably by the effect of a residual stress utilized for dome-shape forming, a gas generated inside a cell is released more reliably and quickly when an internal cell pressure rises abnormally.

The cell safety valve of the present invention may further be such that the annular shape of the break groove is a circle or an ellipse-like shape.

With the above-described configuration such that the plan of the break groove is a round-cornered annular shape such as a circle or an ellipse-like shape, the break groove breaks smoothly when an internal cell pressure rises abnormally, thus quickly exerting the functions of valve plates. The reason for this is as follows. If the plan of the break groove is polygonal-shaped such as a quadrangle, although portions of the break groove having intersection points of the break groove and the break aiding groove break smoothly, it is possible for the breaking to stop at corners of the quadrangle and portions of the break groove that do not have an intersection point of the break groove and the break aiding groove may be prevented from breaking smoothly. Note that the ellipse-like shape includes, as the plan of the break groove, an oval track, an ellipse, and a rounded square.

The cell safety valve of the present invention may further be such that the difference between the break groove and the break aiding groove in the remaining thickness of the valve plate is 5 µm or more.

The difference of the remaining thickness of the valve plate is thus defined in the above-described configuration because if the difference between the break groove and the break aiding groove in the thickness of the valve plate is less than 5 µm, it is possible for the break aiding groove having larger deformation volume to break unnecessarily when dropping impact is applied or an internal cell pressure rises abnormally.

The cell safety valve of the present invention may further be such that a bottom portion of the break aiding groove of the valve plate is wider than a bottom portion of the break groove of the valve plate.

The cell safety valve of the present invention may further be such that the cross section of the break groove of the valve plate is substantially V-shaped, and the cross section of the break aiding groove of the valve plate is substantially U-shaped.

In the present invention, the widths of bottom portions of the break groove and the break aiding groove are defined as follows. When depth down to the deepest bottom of a groove is taken to be 100%, a width 22 at a depth of 90% is taken to be the width of a bottom portion of the groove (see FIGS. 24 and 25). As shown in FIGS. 24 and 25, a deep portion (the bottom portion of the groove near the deepest portion) of the break groove and the break aiding groove may be curved or flat, both applicable to a groove that the valve plate of the present invention comprises. According to this configuration, since a width ($\alpha$) of a bottom portion of the break aiding groove of the valve plate is wider than a width ($\beta$) of a bottom portion of the break groove of the valve plate ($\alpha > \beta$), such a safety valve is provided that breaking is easy for the break groove, while it is not easy for the break aiding groove when an internal cell pressure rises. A reason for this is that a higher pressure is concentrated on a portion (a bottom portion of a groove) to mainly receive an internal pressure as the portion becomes smaller. Here, it is required that the break groove breaks reliably when an internal cell pressure rises. For that purpose, it is preferable that a bottom portion 20 of the break groove is nearly a line rather than a plane as shown in FIG. 22. Accordingly, the cross section of the break groove is nearly V-shaped. Meanwhile, it is required that the break aiding groove is prevented from breaking unnecessarily when an internal cell pressure rises. For that purpose, it is preferable that a bottom portion 21 of the break aiding groove is a plane as shown in FIG. 23. Accordingly, the cross section of the break aiding groove is nearly U-shaped.

In order to accomplish the objects of the present invention, there is provided a cell comprising a positive electrode, a negative electrode, an electrolyte solution, and an outer casing, wherein the outer casing comprises a valve plate with a thickness, an annular-shaped break groove formed on the valve plate, and one or more of break aiding grooves in the inner area of the break groove, and wherein the break aiding groove comprises such a configuration that remaining thickness of the valve plate at the break aiding groove is thicker than remaining thickness of the valve plate at the break groove, and at least one end of the break aiding groove is connected with the break groove.

The cell of the present invention may further be such that both ends of the break aiding groove are connected with the break groove.

The cell of the present invention may further be such that the break aiding groove passes through the center of the safety valve.

The cell of the present invention may further be such that among two or more areas of the valve plate divided by the break groove and the break aiding groove, at least one of the areas is dome-shaped.

The cell of the present invention may further be such that the annular shape of the break groove is a circle or an ellipse-like shape.

The cell of the present invention may further be such that the difference between the break groove and the break aiding groove in the remaining thickness of the valve plate is 5 μm or more.

The cell of the present invention may further be such that a bottom portion of the break aiding groove of the valve plate is wider than a bottom portion of the break groove of the valve plate.

The cell of the present invention may further be such that the cross section of the break groove of the valve plate is V-shaped, and the cross section of the break aiding groove of the valve plate is U-shaped.

According to the above-described configuration, such a cell is provided as to have the above-described safety valve that operates quickly when an internal cell pressure rises, releases a gas inside the cell at the time of operation, and does not operate when dropping impact is applied.

DESCRIPTION OF THE PREFERRED EMBODIMENTS

EXAMPLE 1

An example of the present invention will be described below based on FIGS. 1–13.

Figure 1:
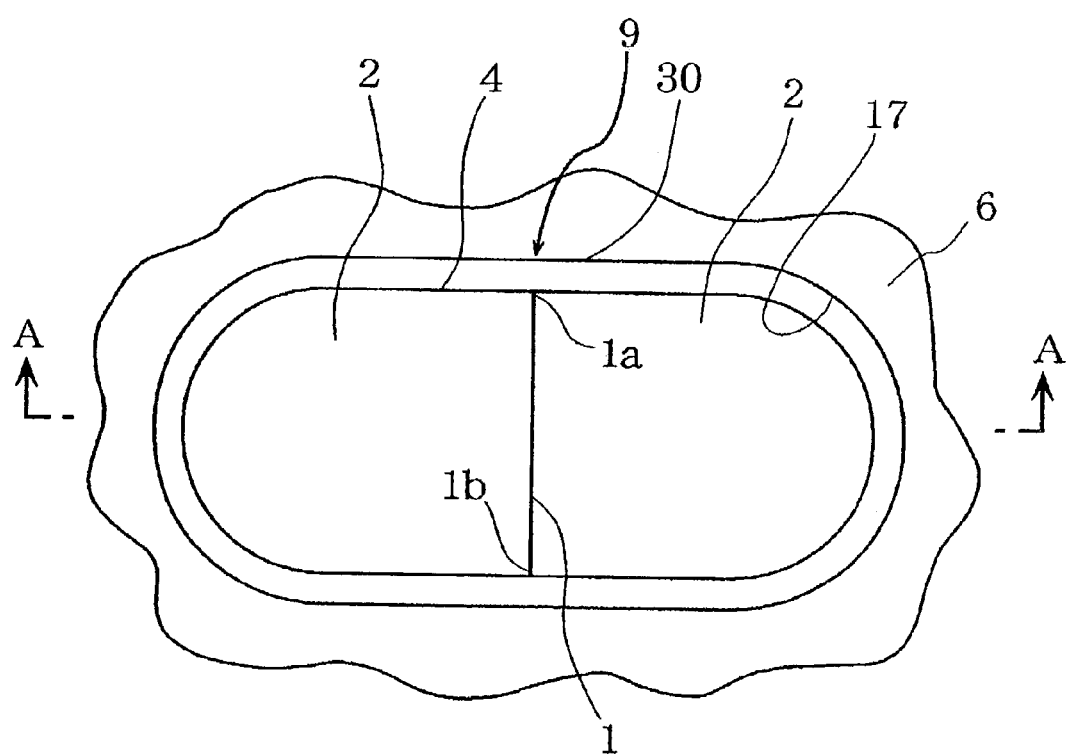
FIG. 1 is a plan view of a valve plate of the present invention.
Figure 2:
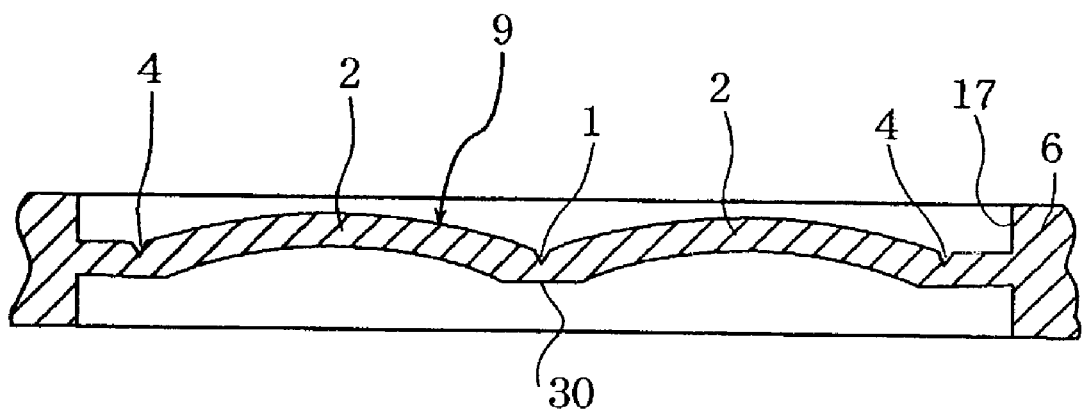
FIG. 2 is a sagittal sectional view taken along the line A—A in FIG. 1.
Figure 3:
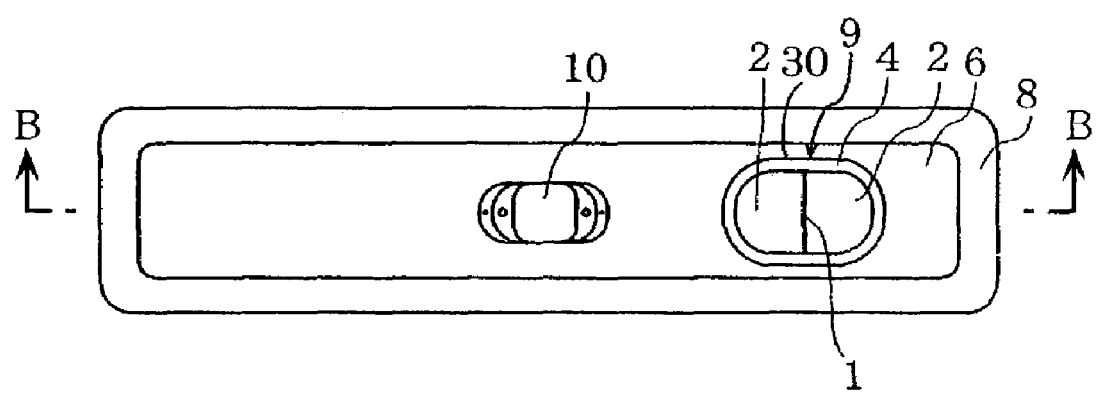
FIG. 3 is a plan view of a non-aqueous electrolyte cell using a safety valve of the present invention.
Figure 4:
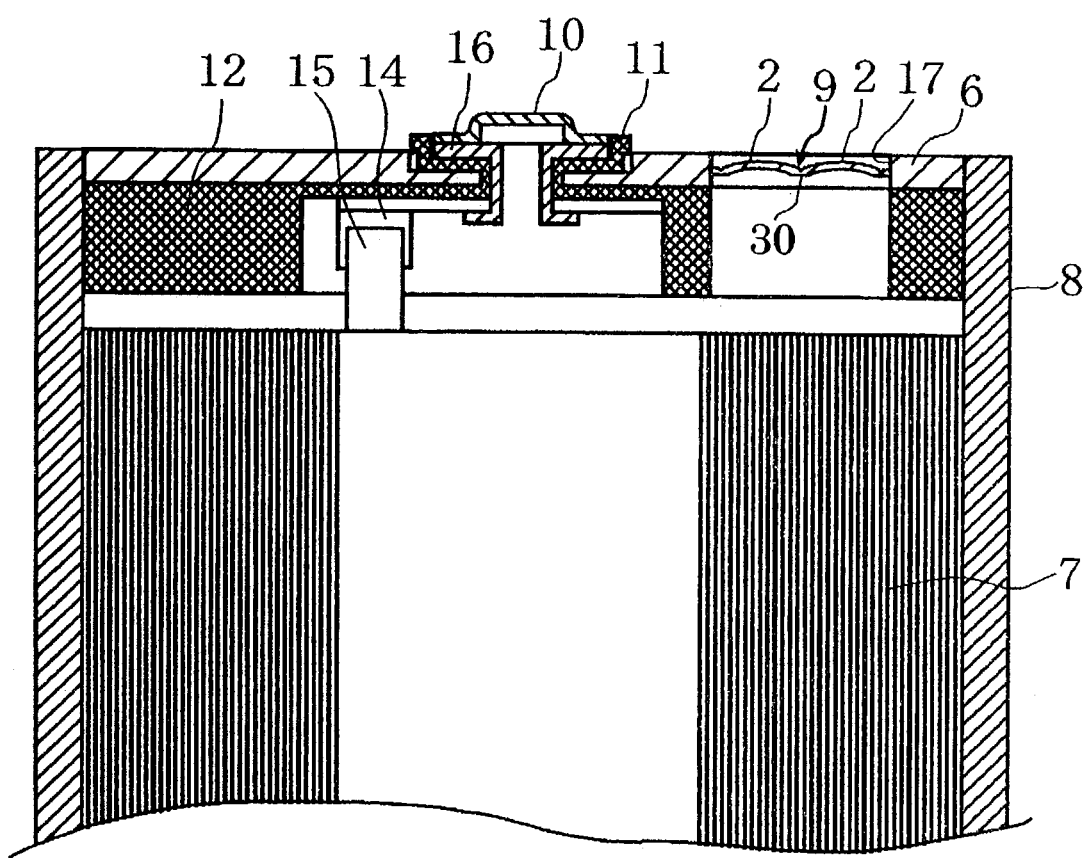
FIG. 4 is a sagittal sectional view taken along the line B—B in FIG. 3.
Figure 5:
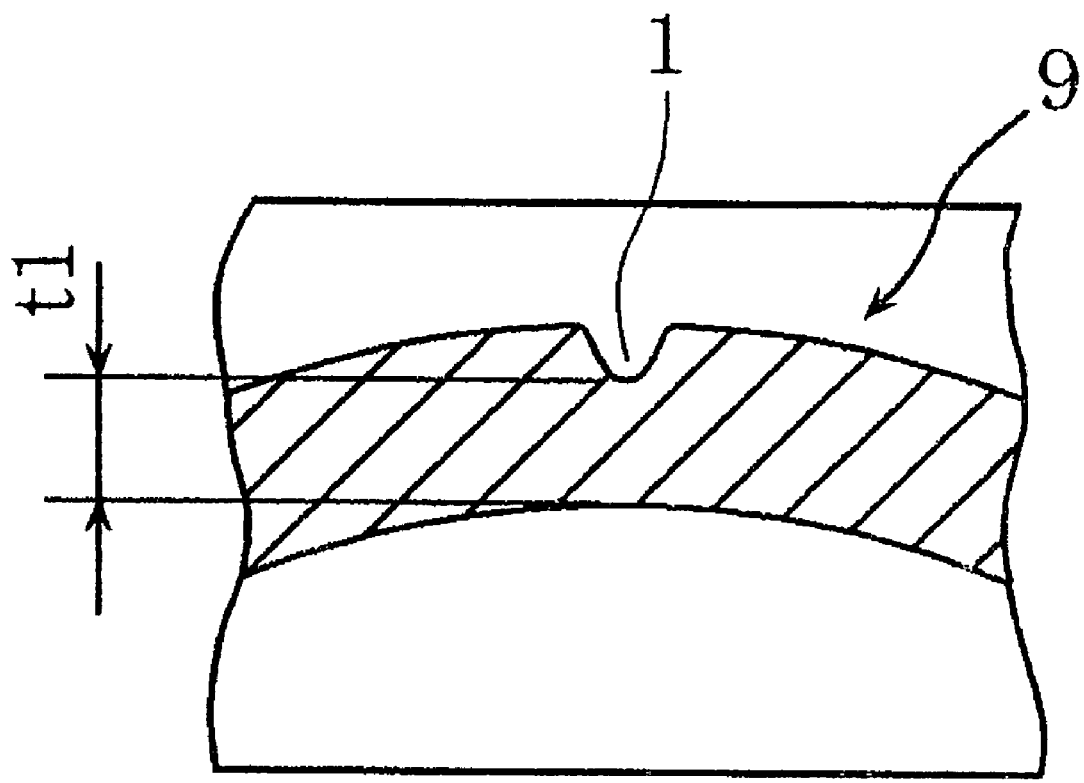
FIG. 5 is an enlarged cross sectional view around a break aiding groove.
Figure 6:
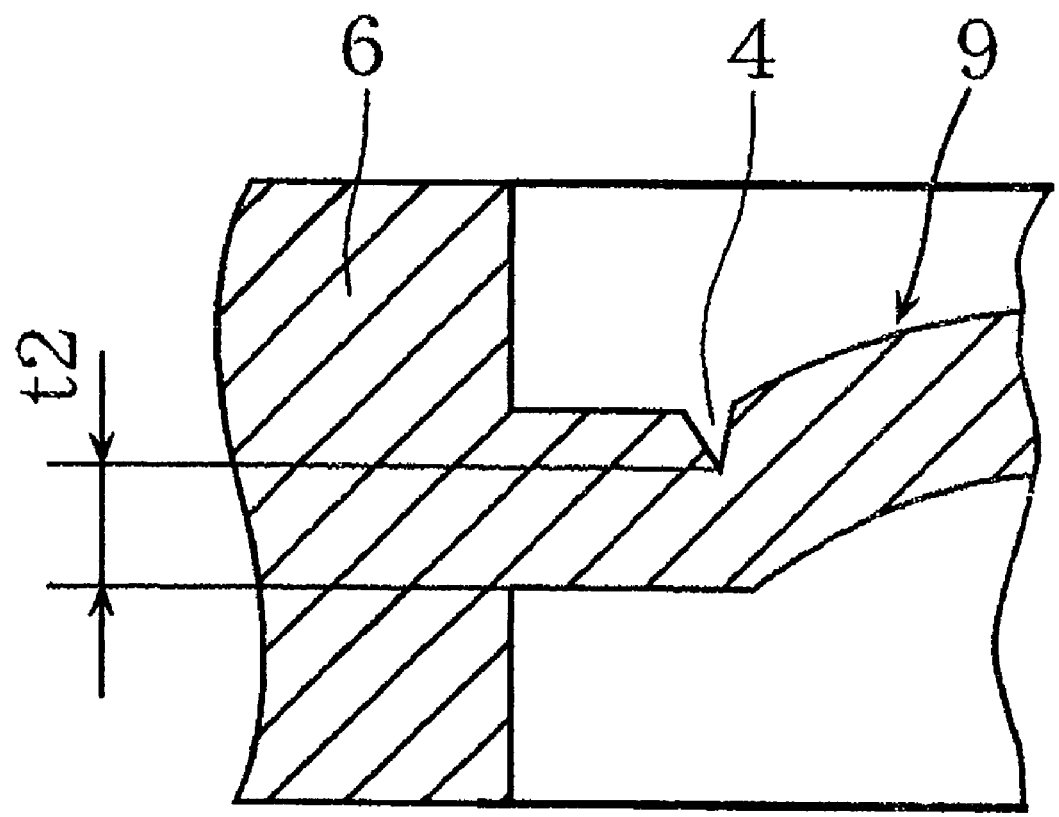
FIG. 6 is an enlarged cross sectional view near a break groove.
Figure 7:
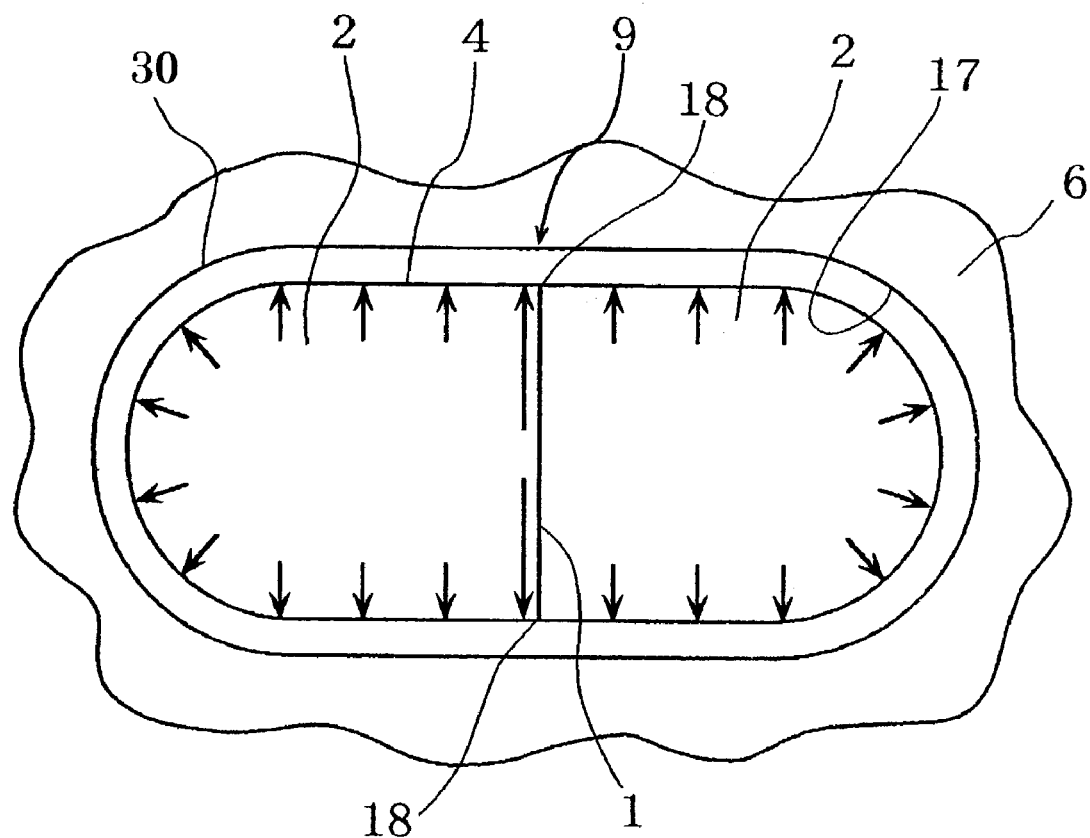
FIG. 7 is a view illustrating a stress applied on a break groove in a safety valve of the present invention when an internal cell pressure rises.
Figure 8:
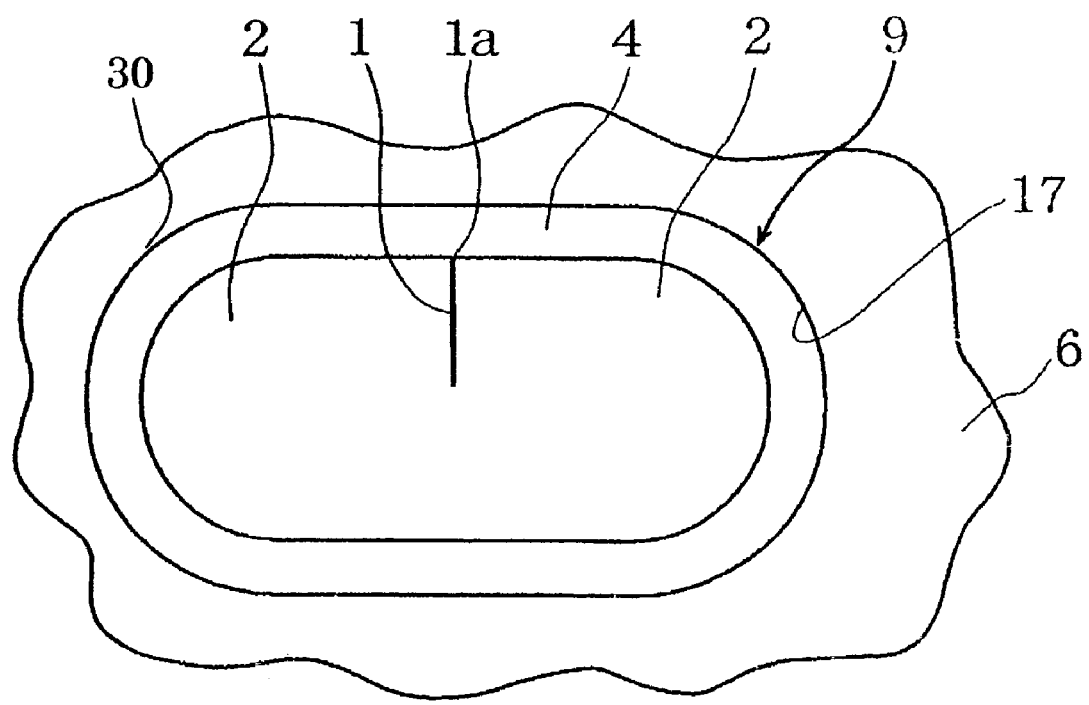
FIG. 8 is a plan view of a safety valve in another example.
Figure 9:
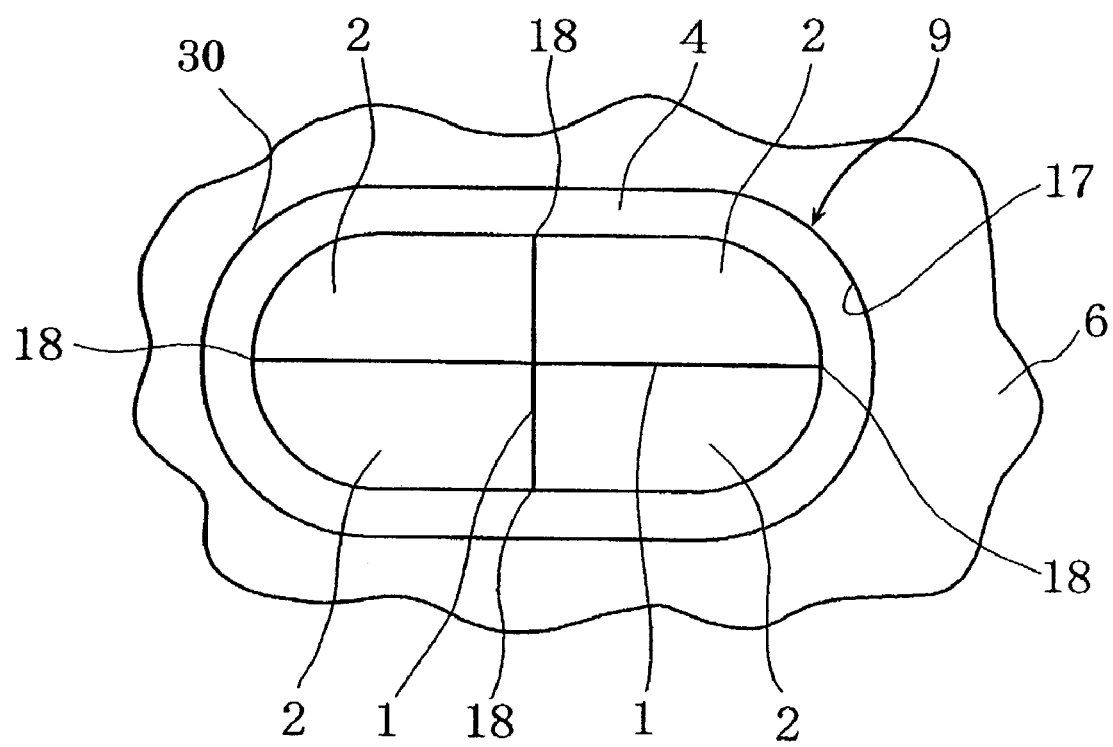
FIG. 9 is a plan view of a safety valve in another example.
Figure 10:
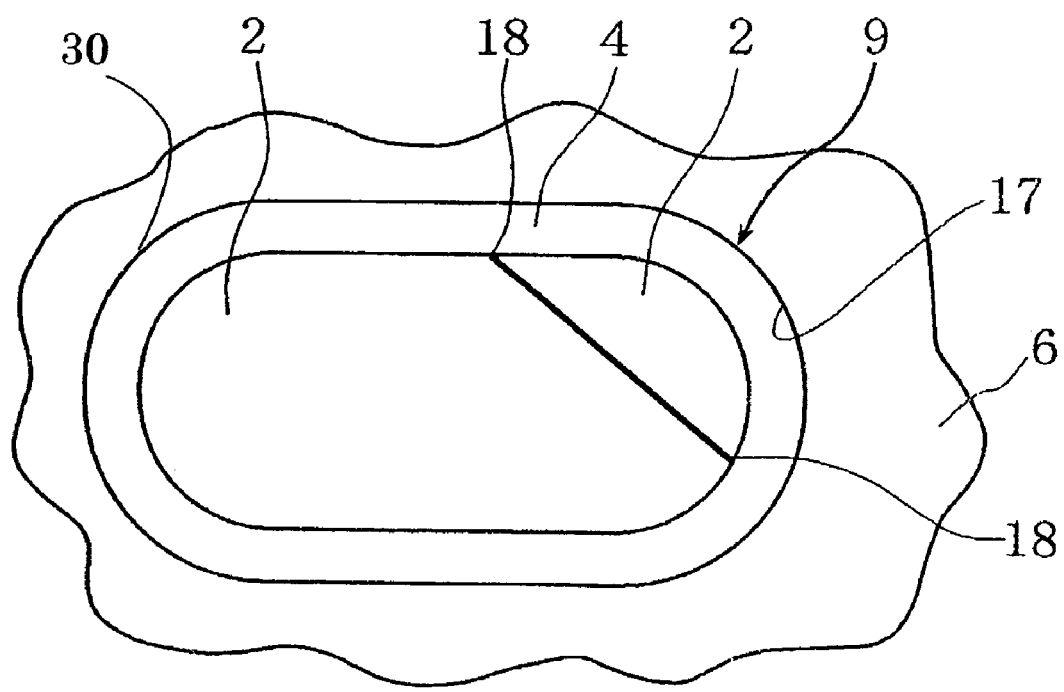
FIG. 10 is a plan view of a safety valve in another example.
Figure 11:
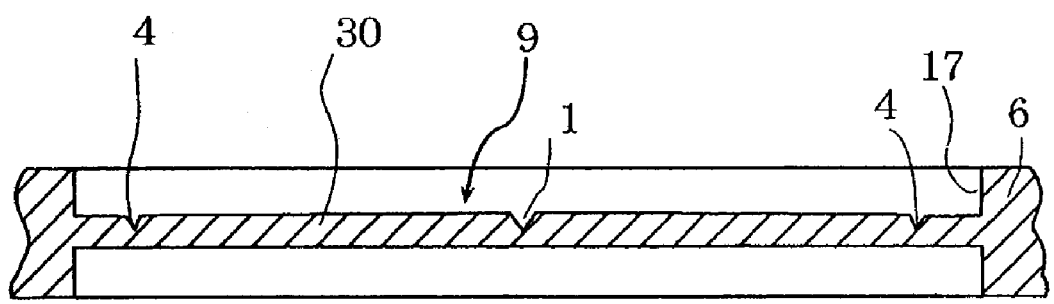
FIG. 11 is a cross sectional view of a safety valve when the safety valve is plane-shaped.
Figure 12:
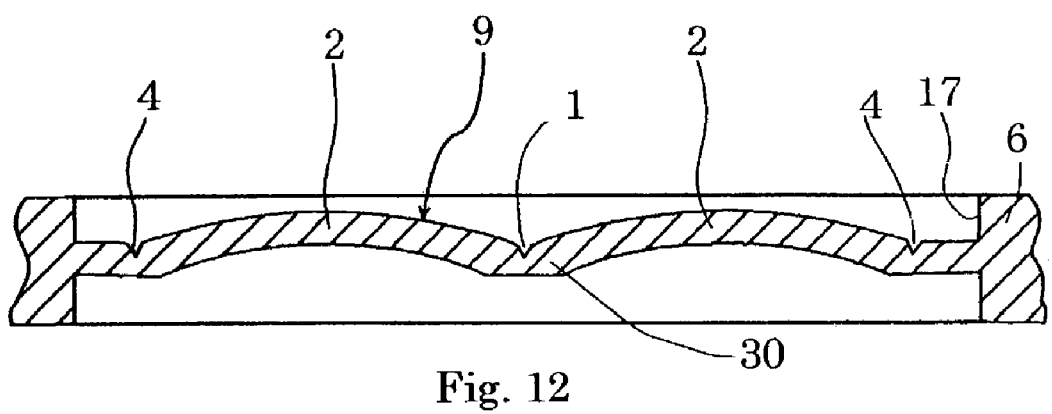
FIG. 12 is a cross sectional view of a safety valve when the safety valve is dome-shaped.
Figure 13:
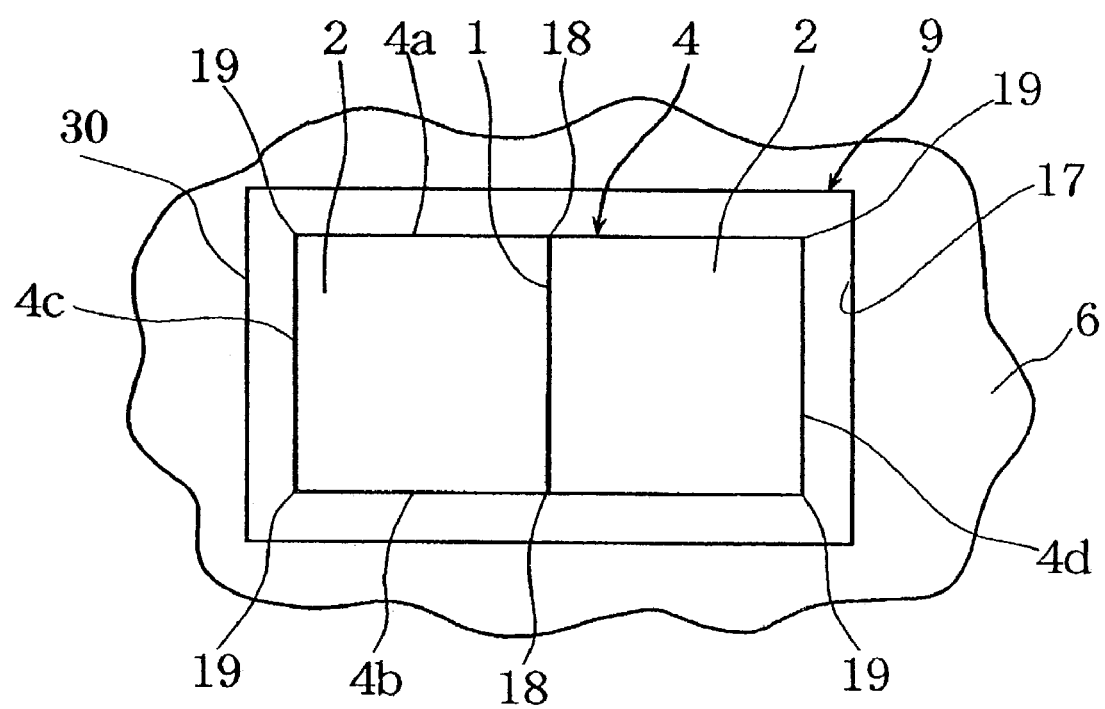
FIG. 13 is a plan view of a safety valve in another example.

FIG. 1 is a plan view of a valve plate of the present invention. FIG. 2 is a sagittal sectional view taken along the line A—A in FIG. 1. FIG. 3 is a plan view of a non-aqueous electrolyte cell using a safety valve of the present invention. FIG. 4 is a sagittal sectional view taken along the line B—B in FIG. 3. FIG. 5 is an enlarged cross sectional view around a break groove. FIG. 6 is an enlarged cross sectional view near a break aiding groove. FIG. 7 is a view illustrating a stress applied on the break groove in a safety valve of the present invention when an internal cell pressure rises. FIG. 8 is a safety valve of a valve plate in another example. FIG. 9 is a plan view of a safety valve in another example. FIG. 10 is a plan view of a safety valve in another example. FIG. 11 is a cross sectional view of a valve plate when the valve plate is plane-shaped. FIG. 12 is a cross sectional view of a valve plate when the valve plate is dome-shaped. FIG. 13 is a plan view of a safety valve in another example.

As shown in FIG. 3, a non-aqueous electrolyte cell of an example of the present invention has a cylindrical outer casing 8 that houses therein a flat spiral electrode element 7 composed of a positive electrode with an aluminum-alloy current collector having formed thereon an active material layer mainly made of $LiCoO_2$, a negative electrode with a copper current collector having formed thereon an active material layer mainly made of graphite, and a separator for separating these two electrodes. Into the outer casing 8 is poured an electrolyte solution wherein $LiPF_6$ is dissolved at a ratio of 1M (mole/liter) in a mixture solvent in which ethylene carbonate (EC) and dimethyl carbonate (DMC) are mixed at a volumetric ratio of 4:6. Further, in an opening hole of the outer casing 8, a sealing plate 6 (thickness: 1 mm) made of an aluminum alloy is laser-welded, thus sealing this cell.

The sealing plate 6 is sandwiched by a sandwiching part 16 together with a gasket 11, an insulating plate 12, and a conducting plate 14. On the sandwiching part 16 is fixed a negative-electrode terminal cap 10. Also, a negative-electrode tab 15 extending from the negative electrode is electrically connected with the negative-electrode terminal cap 10 via the conducting plate 14 and the sandwiching part 16, while the positive electrode is electrically connected with the outer casing 8 via a positive-electrode tab (not shown).

In this configuration, the sealing plate 6 and the insulating plate 12 have an opening hole 17 having therein a safety valve 9 (made of an aluminum alloy like the sealing plate 6) made of a thin valve plate 30 (as thick as 70 μm) formed integrally with the sealing plate 6 as shown in FIGS. 1 and 2. The plan of the safety valve 9 is oval track-shaped, and the valve has such a configuration that a break groove 4 breaks to release a gas inside the cell to the outside of the cell if an internal cell pressure exceeds a predetermined value. The valve plate has two dome portions 2 that are bulged in dome shapes in a direction toward the outside of the cell. At the periphery of the dome portions 2·2 is formed a break groove 4 to facilitate the breaking of the valve plate 30. The plan of the break groove 4 is oval track-shaped, and the cross section of the break groove 4 is V-shaped as shown in FIG. 6 in order to facilitate the breaking of the break groove 4 when an internal cell pressure rises. Further, on a portion to pass through the center of the valve plate 30 which is between the dome portions 2·2, a break aiding groove 1 is formed, and end-edges 1a·1b of the break aiding groove 1 are connected with the break groove 4. The cross section of the break aiding groove 1 is U-shaped as shown in FIG. 5 in order to prevent it from breaking when an internal cell pressure rises. The remaining thickness (corresponding to t1 in FIG. 5, and hereinafter abbreviated as remaining thickness of a break aiding groove) of a portion of the valve plate above which the break aiding groove 1 is formed is 41 μm, while the remaining thickness (corresponding to t2 in FIG. 6, and Hereinafter abbreviated as remaining thickness of a break groove) of a portion of the valve plate above which the break groove 4 is formed is 31 μm. Thus, the remaining thickness of the break aiding groove is formed to be thicker than that of the break groove.

In the above-described configuration such that the break aiding groove 1 is formed on a portion to pass through the center of the valve plate 30 which is between the dome portions 2·2, a deformation stress of the inner area of the break groove 4 results in a large stress applied on the break aiding groove 1 when an internal cell pressure rises. Subsequently, since the end-edges 1a·1b of the break aiding groove 1 are connected with the break groove 4, the stress is concentrated on intersection points 18·18 of the break aiding groove 1 and the break groove 4 as shown in FIG. 7. As a result, when an internal cell pressure rises, the valve plate 30 breaks reliably starting from the intersection points of the break aiding groove 1 and the break groove 4 so that the safety valve operates quickly.

A non-aqueous electrolyte cell having the above-mentioned configuration was prepared as follows.

First, a 90 weight % of $LiCoO_2$ as a positive-electrode activating material, a 5 weight % of carbon black as a conducting agent, a 5 weight % of poly-vinylidene fluoride as a binder, and an N-methyl-2-pyrrolidone (NMP) as a solvent were mixed to prepare a slurry, which was then applied to both surfaces of an aluminum thin plate acting as a positive-electrode collector. Then, the solvent was dried and compressed by a roller to a predetermined thickness and then cut to predetermined width and length, to subsequently weld a positive-electrode collector tab made of an aluminum alloy to the positive-electrode collector.

Concurrently with this step, a 95 weight % of graphite powder as a negative-electrode activating material, a 5 weight % of poly-vinylidene fluoride as a binder, and an NMP solution as a solvent were mixed to prepare a slurry, which was then applied to both surfaces of a copper thin plate acting as a negative-electrode collector. Then, the solvent was dried and compressed by a roller to a predetermined thickness and cut to predetermined width and length, to subsequently weld a negative-electrode collector tab made of nickel to the negative-electrode collector.

Next, the positive and negative electrodes were wound with therebetween a separator made of a polyethylene-made micro-porous film to form the flat spiral electrode element 7, which was inserted to the outer casing 8.

Concurrently with this step, a thinner sheet portion was formed at a predetermined position on the sealing plate by forging (a type of plasticity working) and then subjected to coining (another type of plasticity working) to form the break groove 4 and the break aiding groove 1 in addition to providing dome portions 2·2, thus forming the safety valve 9 integrally with the sealing plate 6. Then, the sealing plate 6, the gasket 11, the insulating plate 12, and the conducting plate 14 were sandwiched by the sandwiching part 16.

Thereafter, the outer casing 8 and the sealing plate 6 were laser-welded to each other in order to pour an electrolyte solution into the outer casing 8 through holes formed in the sandwiching part 16 and fix the negative-electrode terminal cap 10 on the sandwiching part 16, thus preparing the non-aqueous electrolyte cell.

The cell thus prepared is hereinafter referred to as a cell A of the present invention.

EXAMPLE 2

A cell was prepared in the same manner as Example 1 except that the remaining thickness (hereinafter abbreviated as remaining thickness of the break aiding groove) of a portion of the valve plate above which the break aiding groove is formed was set to 35 μm, and the remaining thickness (hereinafter abbreviated as remaining thickness of the break groove) of a portion of the valve plate above which the break groove is formed was set to 25 μm.

The cell thus prepared is hereinafter referred to as a cell B1 of the present invention.

EXAMPLE 3

A cell was prepared in the same manner as Example 1 except that the remaining thickness of the break aiding groove was set to 52 μm, and the remaining thickness of the break groove was set to 42 μm.

The cell thus prepared is hereinafter referred to as a cell B2 of the present invention.

EXAMPLE 4

Figure 15:
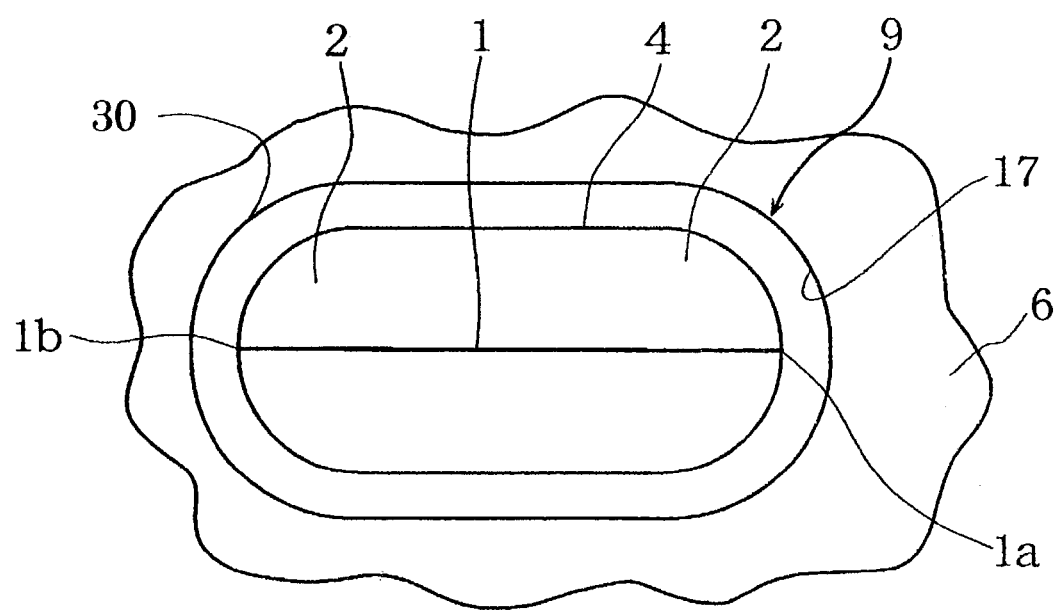
FIG. 15 is a plan view of a safety valve in another example.
Figure 16:
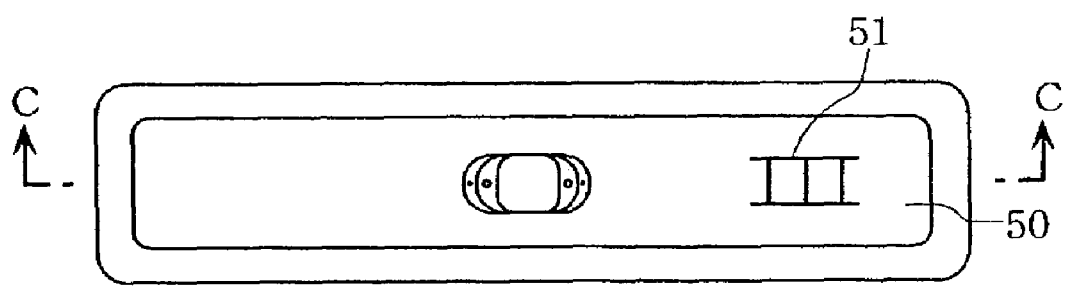
FIG. 16 is a plan view of a non-aqueous electrolyte cell using a safety valve of a prior art example.
Figure 17:
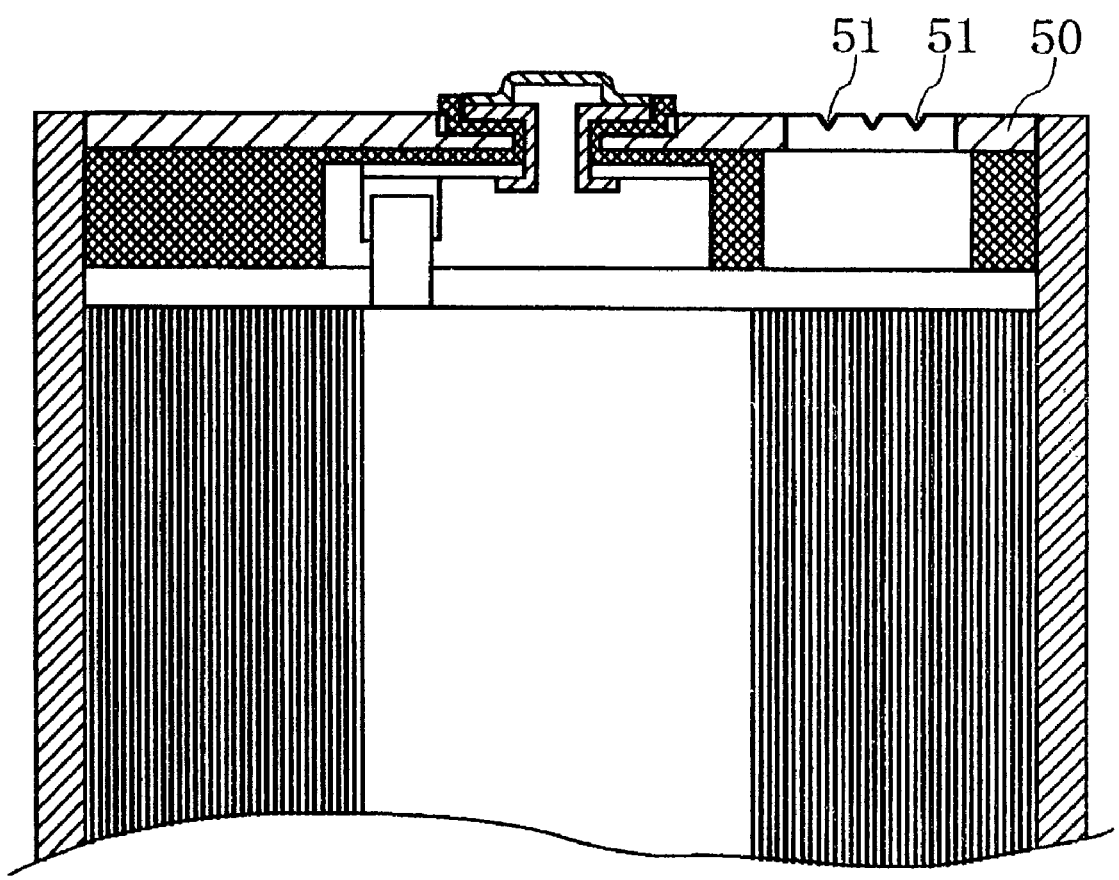
FIG. 17 is a sagittal sectional view taken along the line C—C in FIG. 16.

A cell was prepared in the same manner as Example 1 except that the break aiding groove was formed in the longitudinal direction of the valve plate 30 as shown in FIG. 15.

The cell thus prepared is hereinafter referred to as a cell B3 of the present invention.

COMPARATIVE EXAMPLE 1

Figure 18:
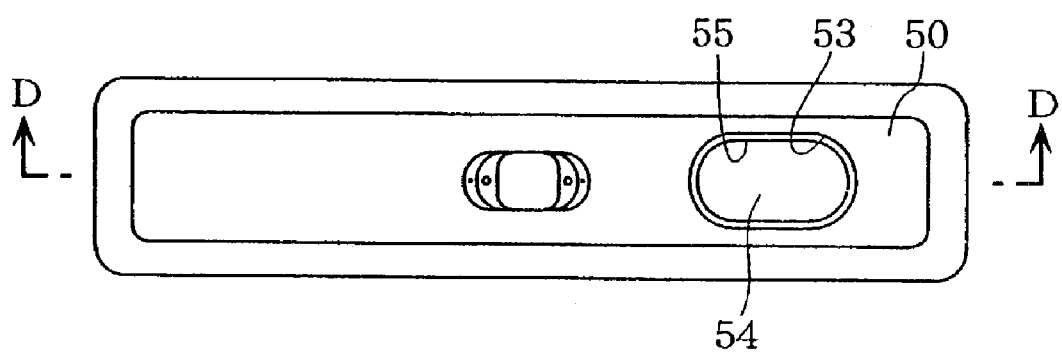
FIG. 18 is a plan view of a non-aqueous electrolyte cell using a safety valve of a prior art example.
Figure 19:
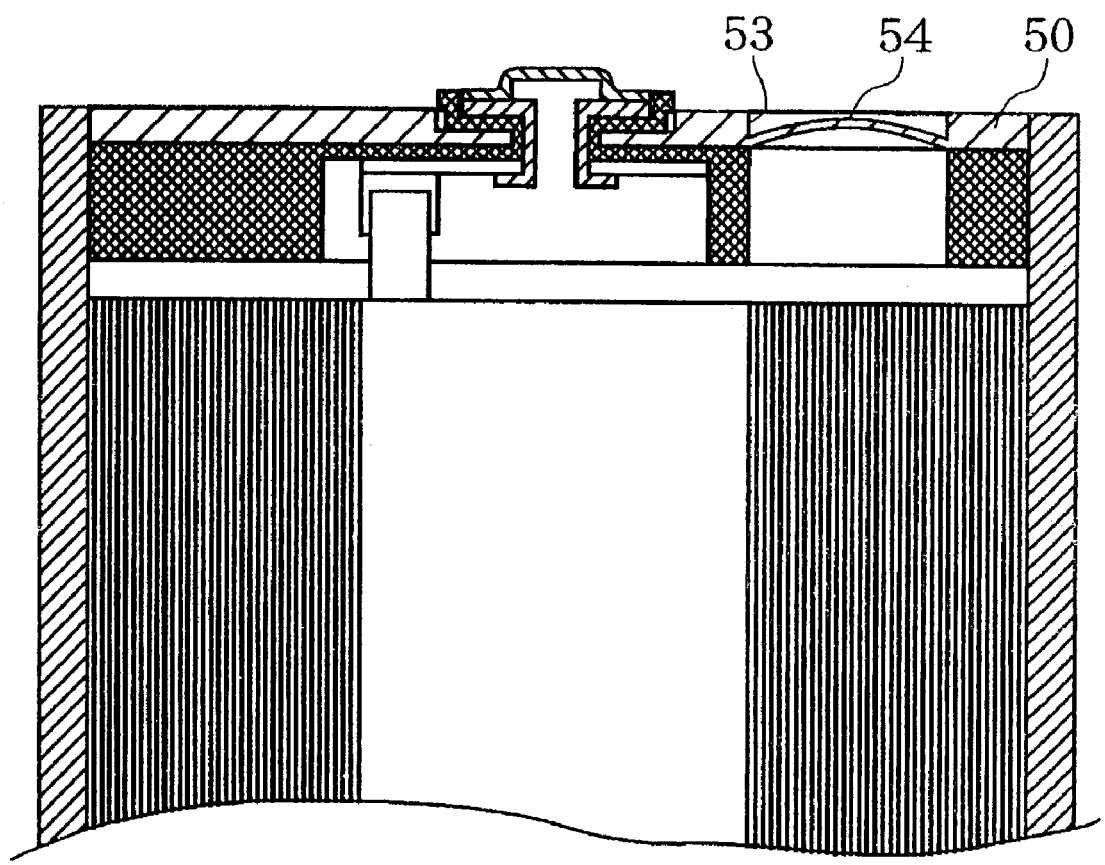
FIG. 19 is a sagittal sectional view taken along the line D—D in FIG. 18.

The same cell was used as Example 1 except that the break aiding groove 1 was not provided on a valve plate as shown in Japanese Unexamined Patent Publication No. 11-273640 (see FIGS. 18 and 19), which is a prior art example (B).

The cell thus prepared is hereinafter referred to as a comparison cell X.

COMPARATIVE EXAMPLE 2

Figure 20:
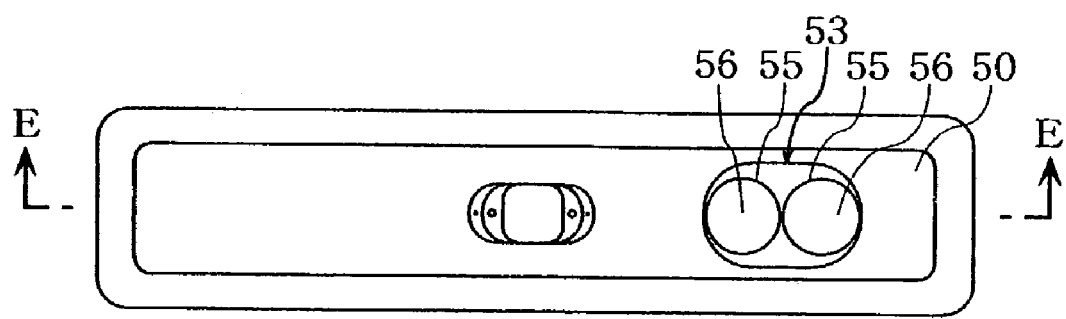
FIG. 20 is a plan view of a non-aqueous electrolyte cell using a safety valve of a prior art example.
Figure 21:
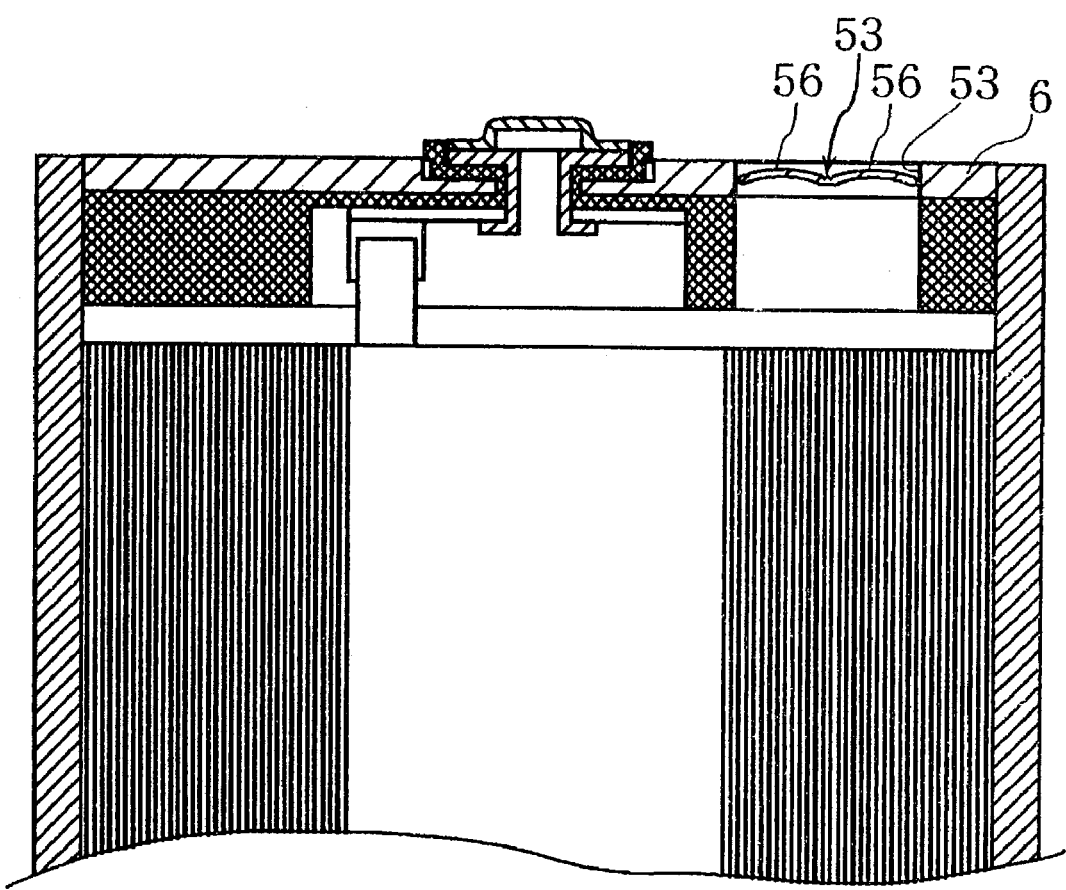
FIG. 21 is a sagittal sectional view taken along the line E—E in FIG. 20.
Figure 22:
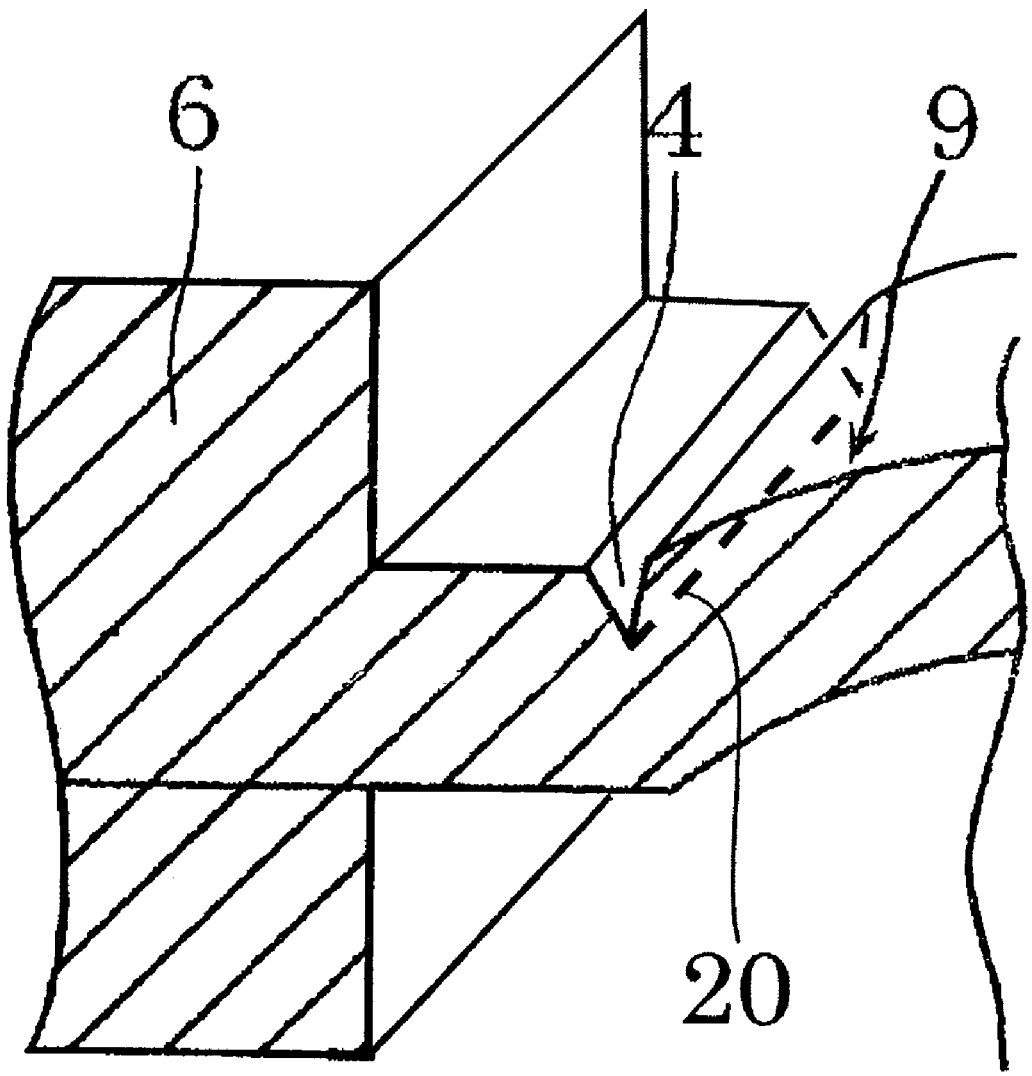
FIG. 22 is a perspective view of an enlarged cross section of around a break groove.
Figure 23:
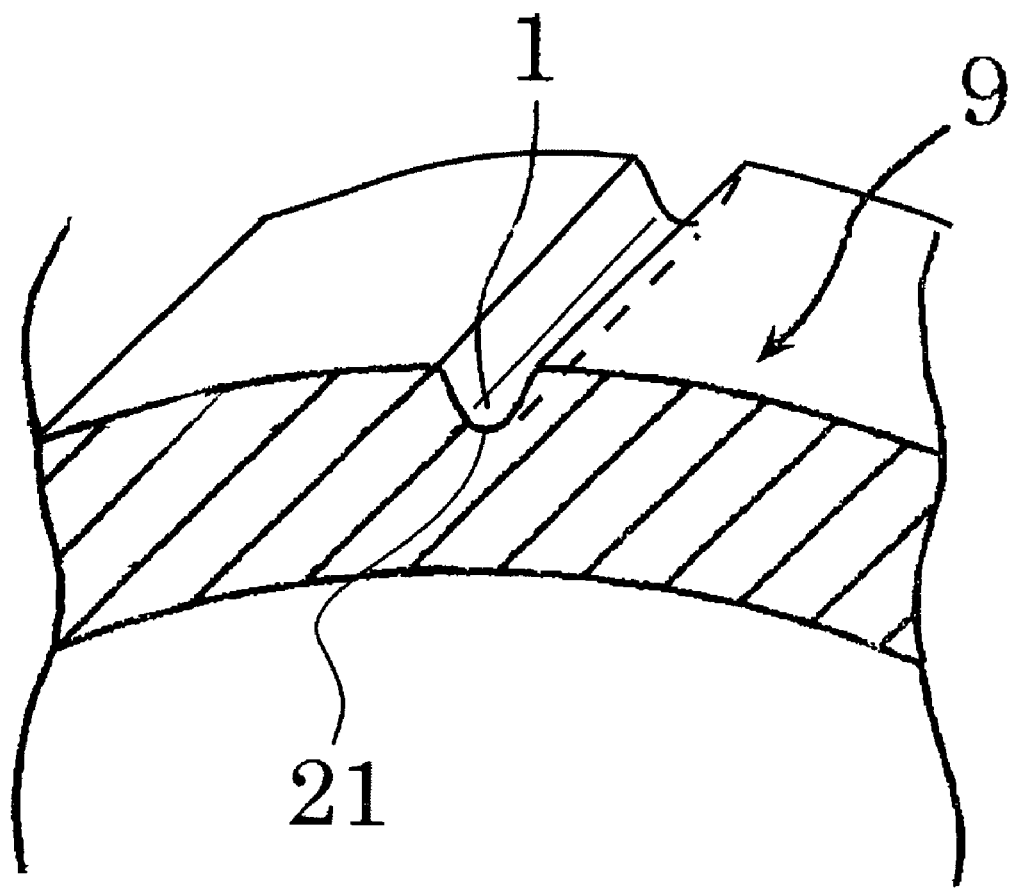
FIG. 23 is a perspective view of an enlarged cross section of around a break aiding groove.
Figure 24:
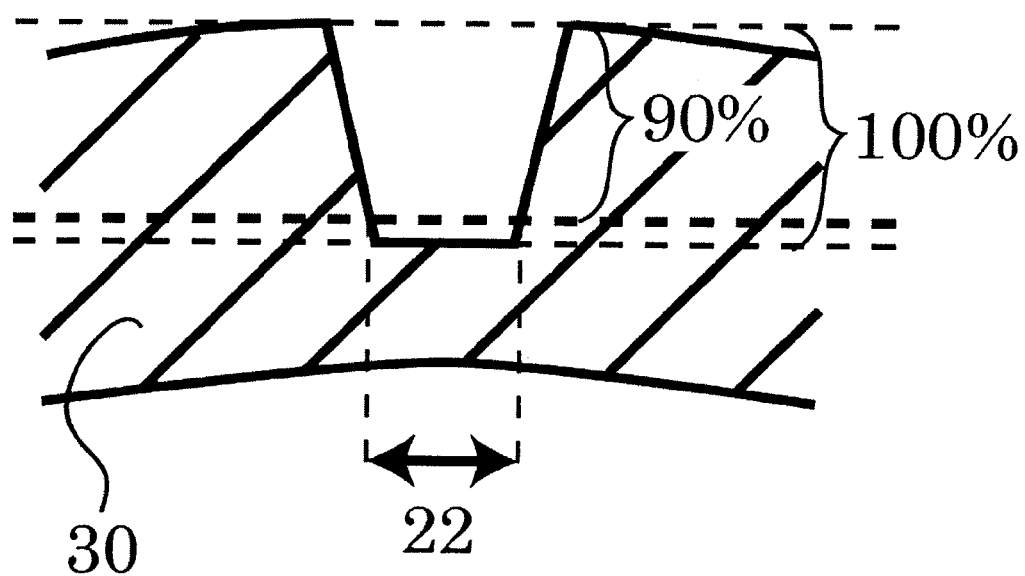
FIG. 24 is a view illustrating to defining the width of the bottom of a groove.
Figure 25:
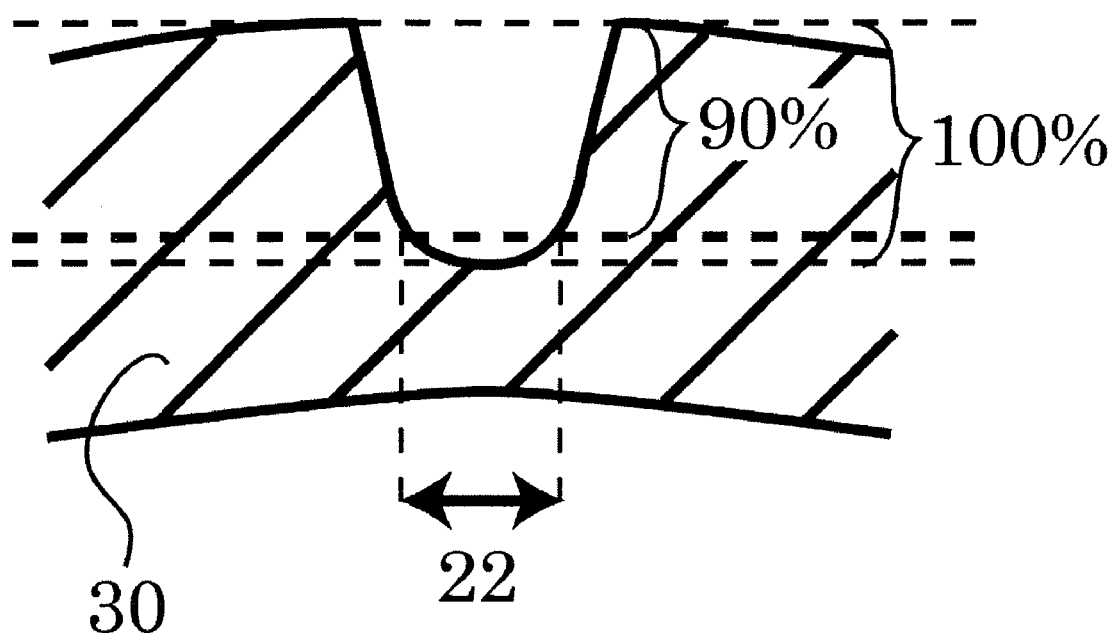
FIG. 25 is a view illustrating to defining the width of the bottom of a groove of another example.

Such a cell was used that two dome portions 56 are formed over an opening hole 53 of a sealing plate 50, and at the periphery of the dome portions 56·56 are formed break grooves 55·55 to facilitate the breaking of a valve plate 30 so that the break grooves 55·55 are adjacent to each other at a substantially center portion of the valve plate 30, as previously proposed by the present inventors in Japanese Unexamined Patent Application No. 2001-325934 (see FIGS. 20 and 21), which is a prior art example (C). Note that remaining thickness of the break groove was set to 22 μm.

The cell thus prepared is hereinafter referred to as a comparison cell Y1.

COMPARATIVE EXAMPLE 3

A cell was prepared in the same manner as Comparative example 2 except that remaining thickness of the break groove was set to 32 μm.

The cell thus prepared is hereinafter referred to as a comparison cell Y2.

(Experiment 1)

The cell A of the present invention and the comparison cell X were subjected to an examination of an operating pressure of each valve plate in such a manner that the negative-electrode terminal cap 10 was removed and then an air pressure was applied on the inside of each cell through holes of a sandwiching part 16. The results are given in Table 1 below. Note that the number of test samples was 20.

TABLE 1

| Cell type | | Cell A of the invention | Comparison cell X |
|---|---|---|---|
| Break aiding groove (remaining thickness of the groove) | | Formed (41 μm) | Not formed |
| Remaining thickness of break groove | | 31 μm | 31 μm |
| Operating pressure (MPa) | Average | 1.76 | 2.28 |
| | Maximum | 1.79 | 2.41 |
| | Minimum | 1.71 | 2.23 |
| | Variations | 0.08 | 0.18 |

As can be apparent from Table 1, the average operating pressure of the cell A of the present invention is lower than that of the comparison cell X by about 0.5 MPa in spite of having the same remaining thickness of the break groove. In addition, there were smaller cell-to-cell variations in operating pressure for the cell A.

Figure 14:
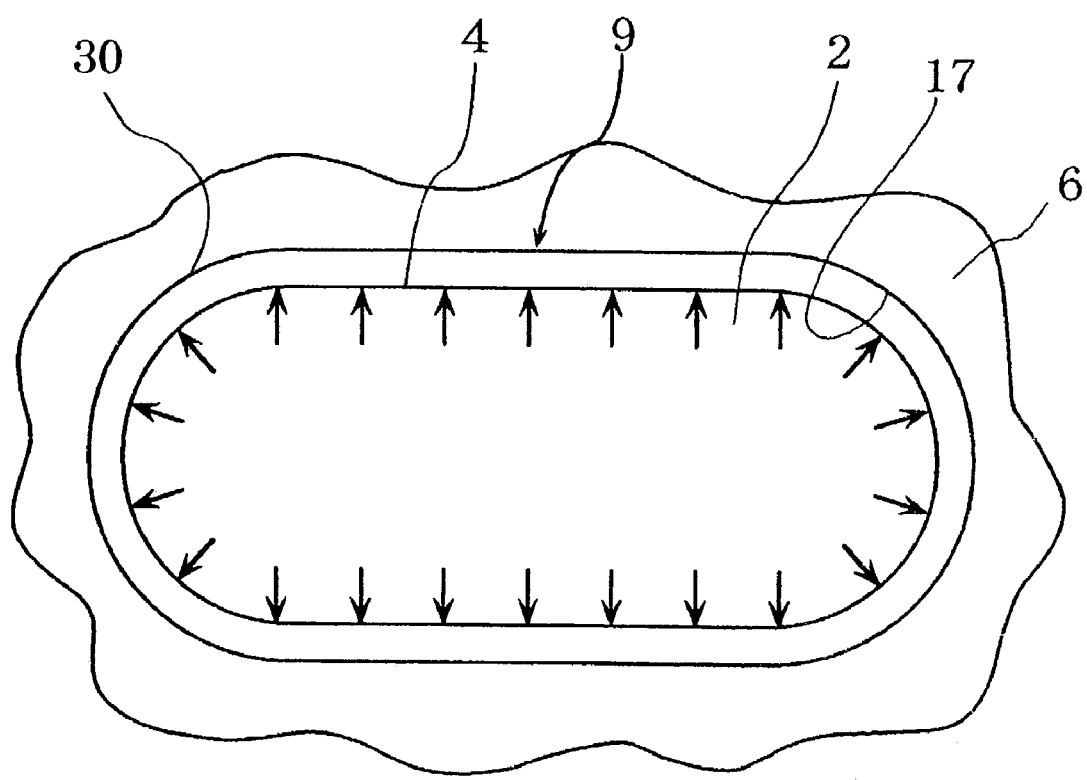
FIG. 14 is a view illustrating a stress applied on a break groove in a safety valve of a control example when an internal cell pressure rises.

The following are conceivable reasons for such results. Like the cell A of the present invention, if the line-shaped break aiding groove 1 is formed at a portion to pass through the center of the valve plate 30 which is between the dome portions 2·2, a deformation stress of the inner area of the break groove 4 results in a stress applied on the break aiding groove 1 when an internal cell pressure rises. Subsequently, since the end-edges 1a·1b are connected with the break groove 4, the stress is concentrated on intersection points 18·18 of the break groove 4 and the break aiding groove 1 as shown in FIG. 7. As a result, when an internal cell pressure rises, the valve plate 30 breaks reliably starting from the intersection points, thus quickly exerting the functions of safety valves. On the other hand, like the comparison cell X, if the break aiding groove is not formed, the stress is applied equally on the break groove 4 as shown in FIG. 14 when an internal cell pressure rises. As a result, the valve plate does not break unless an internal cell pressure rises considerably, thus making it difficult to exert the functions of safety valves quickly.

(Experiment 2)

The cells B1–B3 of the present invention and the comparison cells Y1 and Y2 were subjected to shock tests. Two kinds of shock tests were carried out. In shock test (1), a cell was dropped with each face down, and this series of dropping was taken as one unit (that is, one unit consists of six times of dropping), and the number of units carried out before a valve plate opened was checked. In shock test (2), a cell was dropped with a face having formed thereon the valve plate down, and the number of dropping before the valve plate opened was checked. The results are given in Table 2 below.

TABLE 2

| Cell type | Cell B1 of the invention | Cell B2 of the invention | Cell B3 of the invention | Comparison cell Y1 | Comparison cell Y2 |
|---|---|---|---|---|---|
| Break aiding groove | Formed | Formed | Formed | Not formed | Not formed |

TABLE 2-continued

| Cell type | Cell B1 of the invention | Cell B2 of the invention | Cell B3 of the invention | Comparison cell Y1 | Comparison cell Y2 |
|---|---|---|---|---|---|
| Remaining thickness of break aiding groove | 35 μm | 52 μm | 35 μm | | |
| Remaining thickness of break groove | 25 μm | 42 μm | 25 μm | 22 μm | 32 μm |
| Operating pressure | 1.47 MPa | 2.26 MPa | 1.47 MPa | 1.47 MPa | 2.26 MPa |
| Shock test (1) (6 faces: 1 unit) | Operated at 25–47 units | Operated at 44–71 units | Operated at 20–38 units | Operated at 7–12 units | Operated at 12–21 units |
| Shock test (2) (upside down) | Operated at 39–55 times | Operated at 70–91 times | Operated at 33–42 times | Operated at 19–24 times | Operated at 28–38 times |

The cells B1 and B3 of the present invention and the comparison cell Y1 all having an operating pressure of 1.47 MPa were compared with one another. As for the cells B1 and B3 of the present invention in shock test (1), the safety valve operated at 25–47 units for B1 and 20–38 units for B3, while as for the comparison cell Y1, it was recognized that its safety valve operated at 7–12 units. As for the cells B1 and B3 of the present invention in shock test (2), the valve operated at 39–55 times for B1 and 33–42 times for B3, while as for the comparison cell Y1, it was recognized that its safety valve operated at 19–24 times.

Further, the cell B2 of the present invention and the comparison cell Y2 both having an operating pressure of 2.26 MPa were compared with each other. As for the cell B2 of the present invention in shock test (1), the safety valve operated at 44–71 units, while as for the comparison cell Y2, it was recognized that its safety valve operated at 12–21 units. As for the cell B2 of the present invention in shock test (2), a valve operated at 70–91 times, while as for the comparison cell Y2, it was recognized that its safety valve operated at 28–38 times.

From these results, it was recognized that the cells B1–B3 of the present invention are superior to the comparison cells Y1 and Y2 in shock resistance even though they all the same operating pressure. A conceivable reason for this is that since the cells B1·B3 of the present invention are provided with the break aiding groove, it is possible to have thicker remaining thickness of the break groove compared with the comparison cells Y1 and Y2.

In addition, the difference of remaining thickness of the break groove between the comparison cells Y1 and Y2 was 10 μm (remaining thickness of the break groove of the comparison cell Y2: 32 μm, remaining thickness of the break groove of the comparison cell Y1: 22 μm), and the difference of operating pressure of the valve plate between the comparison cells Y1 and Y2 was 0.79 MPa (the operating pressure of the safety valve of the comparison cell Y2: 2.26 MPa, the operating pressure of the safety valve of the comparison cell Y1: 1.47 MPa). It was recognized from this that in the safety valve of the comparison cells Y1 and Y2, the operating pressure of the safety valve changes by 0.08 MPa per 1 μm of remaining thickness of the break groove.

On the other hand, the difference of remaining thickness of the break groove between the cells B1 and B2 of the present invention was 17 μm (the remaining thickness of the break groove of the cell B2: 42 μm, the remaining thickness of the break groove of the cell B1: 25 μm), and the difference of the operating pressure of the safety valve between the cells B1 and B2 of the present invention was 0.79 MPa (the operating pressure of the safety valve of the cell B2: 2.26 MPa, the operating pressure of the safety valve of the cell B1: 1.47 MPa). It was recognized from this that in the safety valve of the cells B1 and B2 of the present invention, the operating pressure of the safety valve changes only by 0.05 MPa per 1 μm of remaining thickness of the break groove.

Accordingly, compared with the comparison cells Y1 and Y2, the cells B1 and B2 of the present invention have smaller cell-to-cell variations in the operating pressure of the valve plate in spite of cell-to-cell variations in the remaining thickness of the break groove. This makes it possible to set a tolerance for cell-to-cell thickness variations of the break groove in manufacturing valve plates. As a result, quality control and metal mold adjustment are facilitated, thus increasing productivity.

[Other Items]

(A) In the above examples, although the both end-edges 1a·1b of the break aiding groove 1 are connected with the break groove 4, it is not to be limited to such configuration, and it is possible to employ such a configuration that only the end-edge 1a of the break aiding groove 1 is connected with the break groove 4 as shown in FIG. 8.

However, like the above examples, when the both end-edges 1a·1b are connected with the break groove 4, two points are obtained on which a stress resulting from the deformation of the valve plate 30 is concentrated, thus allowing the safety valve to operate smoothly.

(B) In the above examples, although only one break aiding groove 1 is provided, it is not to be limited to such configuration, and it is possible to provide two break aiding grooves 1 as shown in FIG. 9. It is further possible to provide three or more of break aiding grooves 1. However, a single break aiding groove 1 is preferable to have a stress that is applied on the break aiding groove concentrated on it.

(C) In the above examples, although the break aiding groove 1 passes through the center of the valve plate 30, it is not to be limited to such configuration, and it is possible for the break aiding groove 1 not to pass through the center of the valve plate, for example, as shown in FIG. 10.

However, like the above examples, when the break aiding groove 1 passes through the center of the valve plate 30, a stress resulting from the deformation of the valve plate and applied on the break aiding groove 1 is made extremely higher, because the center of the valve plate is the point that has the largest deformation volume in the valve plate. Accordingly, a higher stress is concentrated on the intersection points 18·18 of the break aiding groove 1 and the break groove 4, and the valve plate opens more reliably, thus quickly exerting the functions of the safety valve 9.

Figure 26:
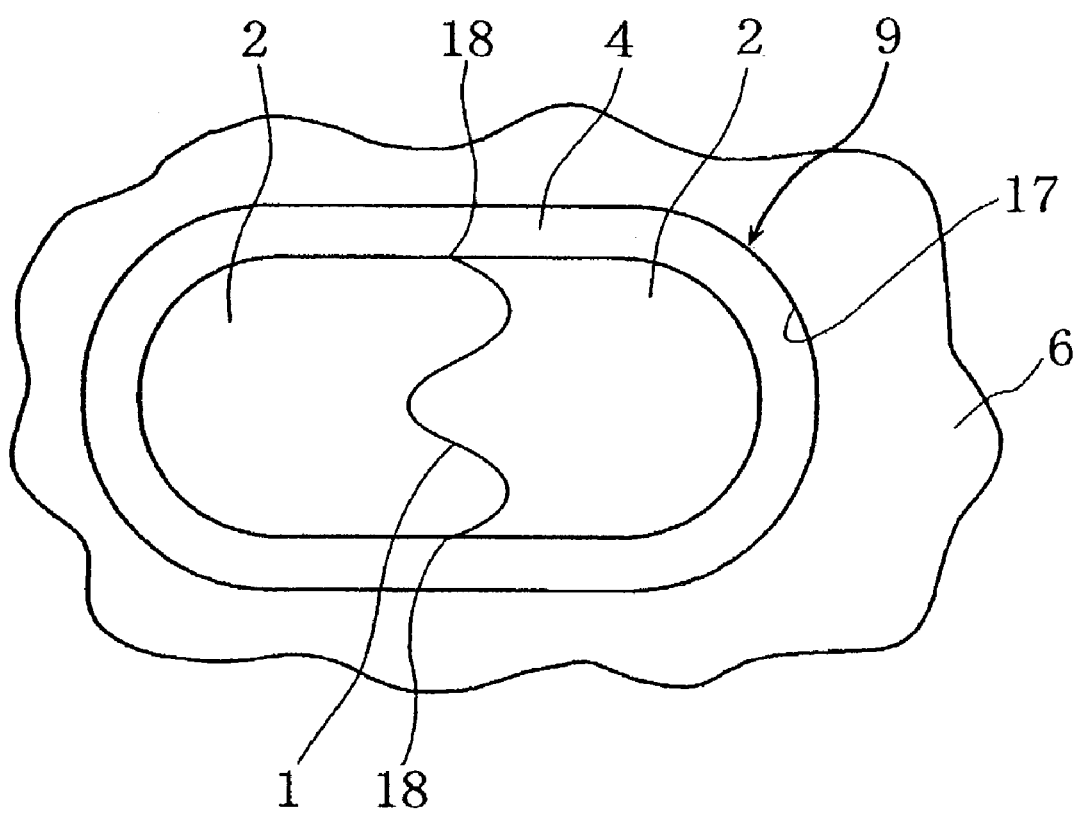
FIG. 26 is a plan view of a safety valve in another example.
Figure 27:
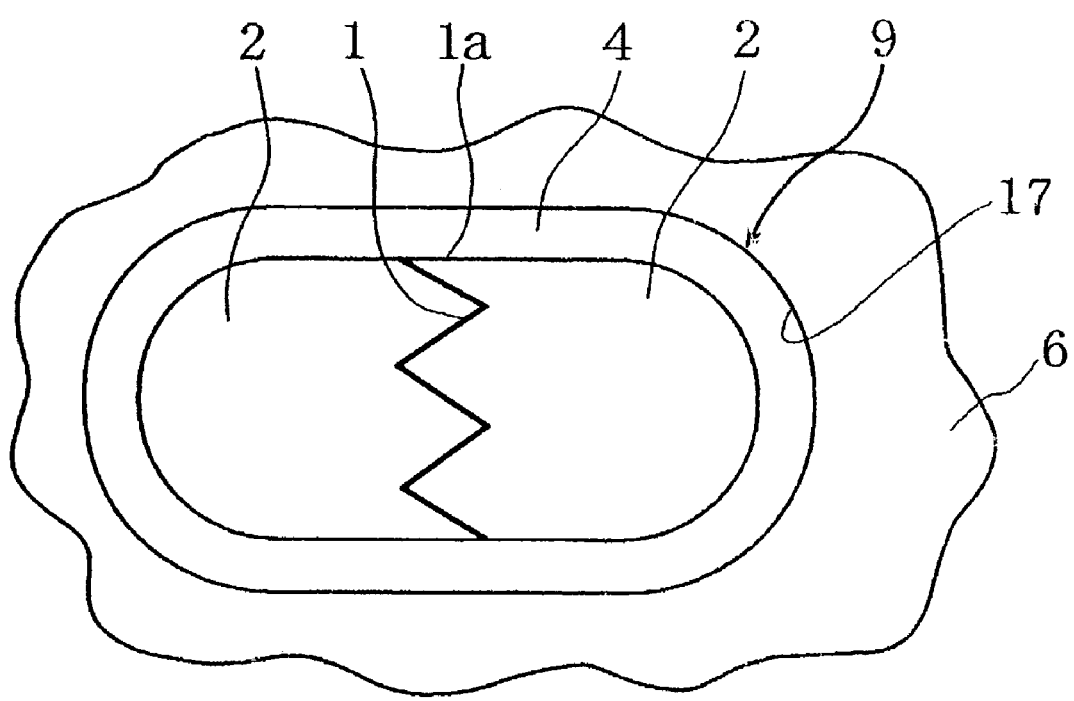
FIG. 27 is a plan view of a safety valve in another example.
Figure 28:
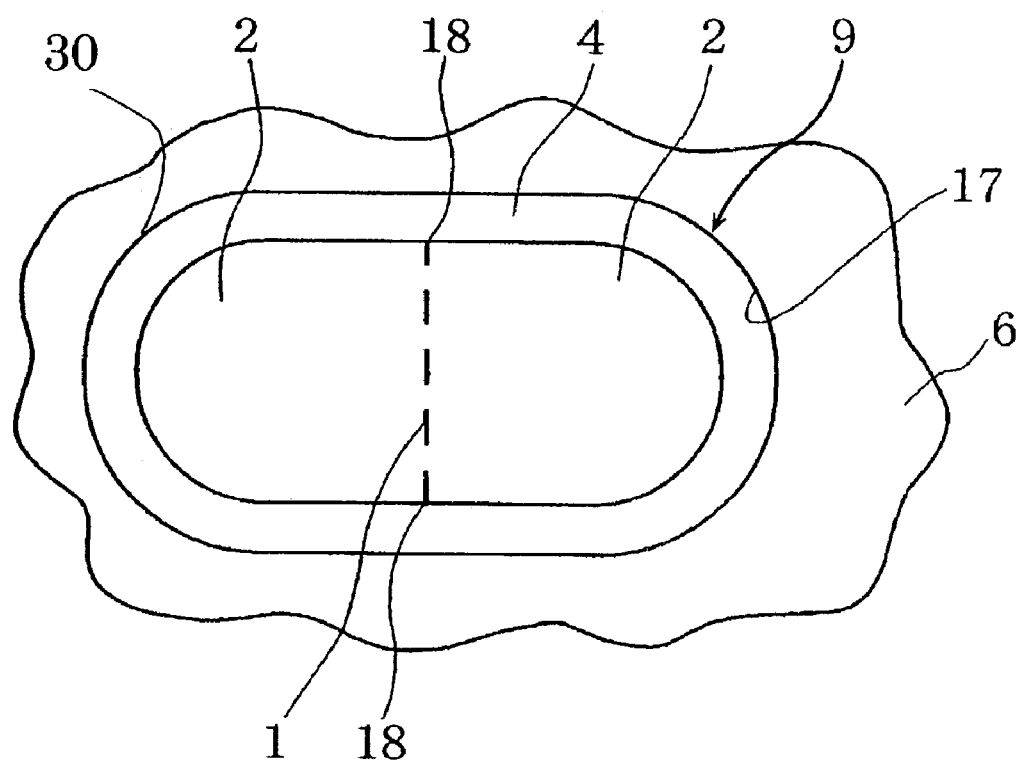
FIG. 28 is a plan view of a safety valve in another example.
Figure 29:
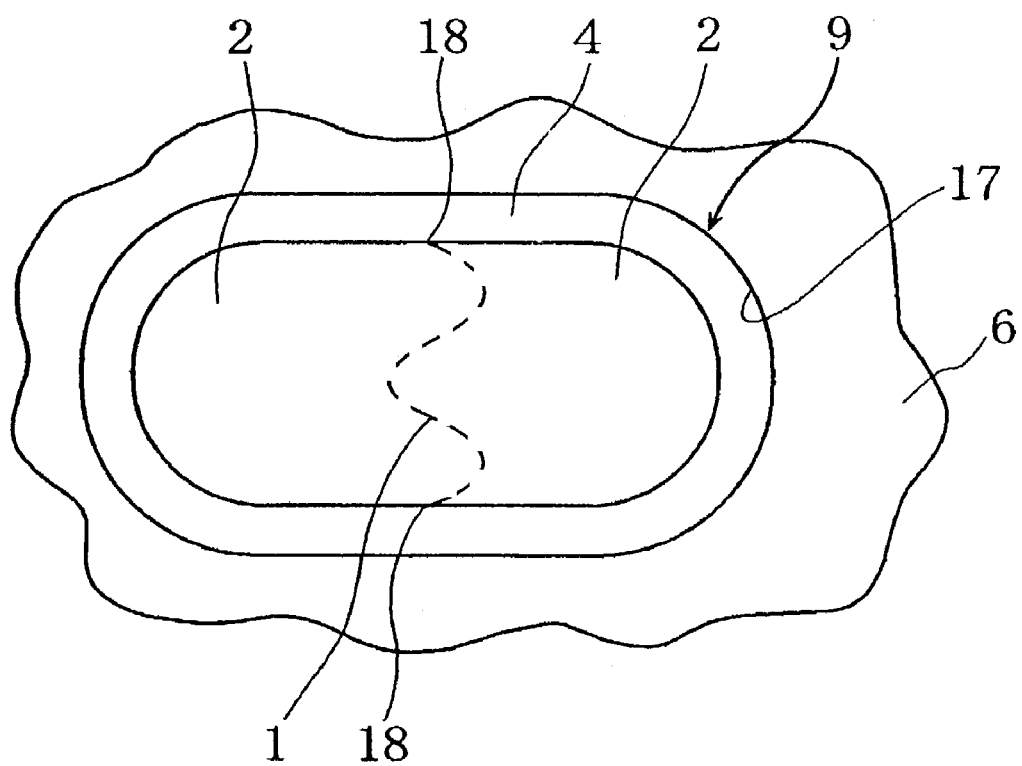
FIG. 29 is a plan view of a safety valve in another example.
Figure 30:
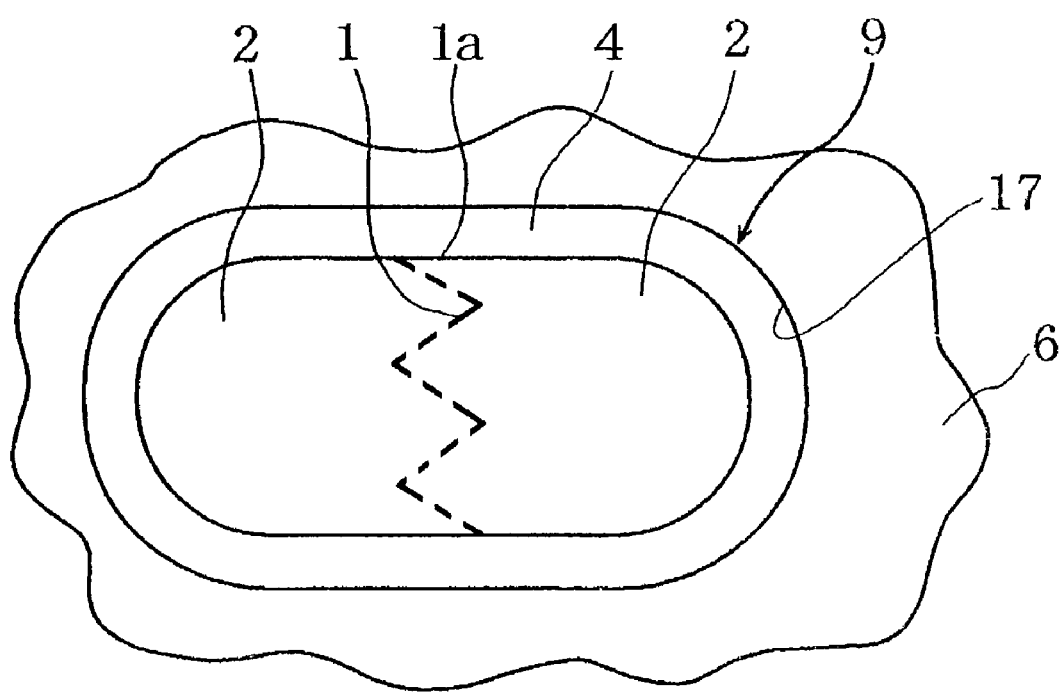
FIG. 30 is a plan view of a safety valve in another example.
Figure 31:
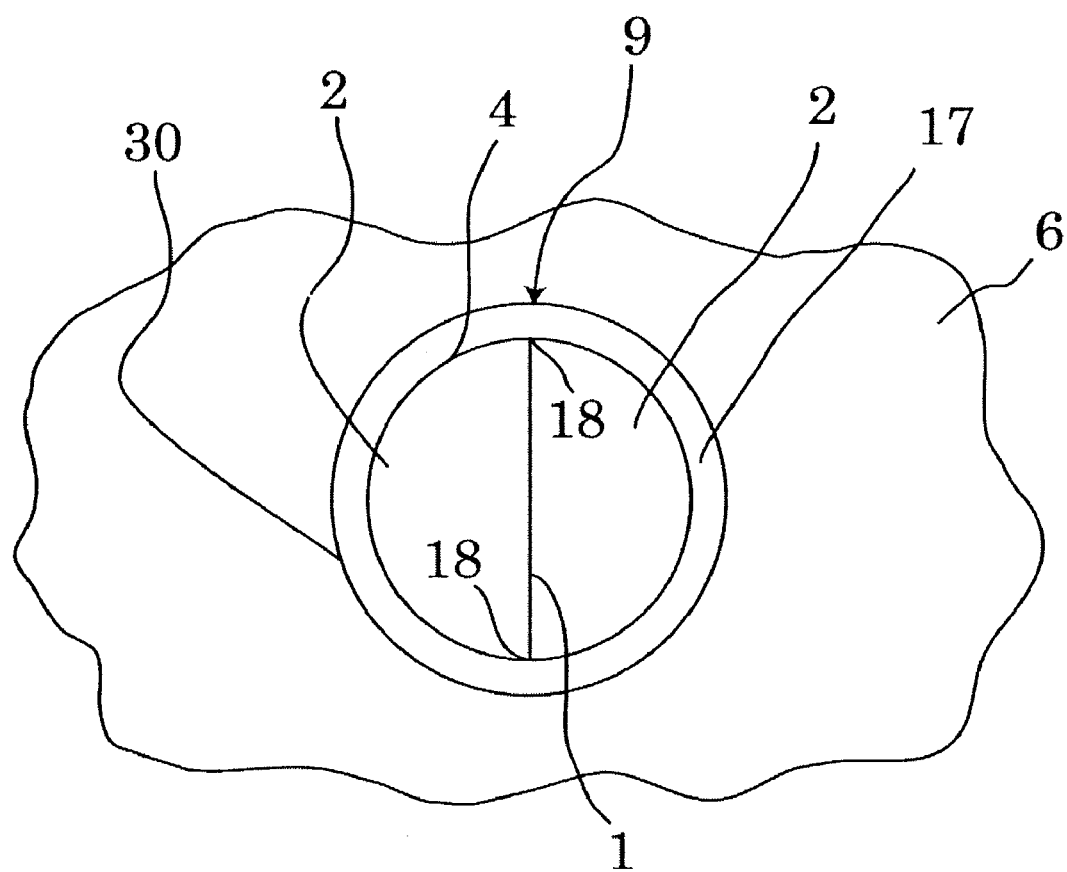
FIG. 31 is a plan view of a safety valve in another example.
Figure 32:
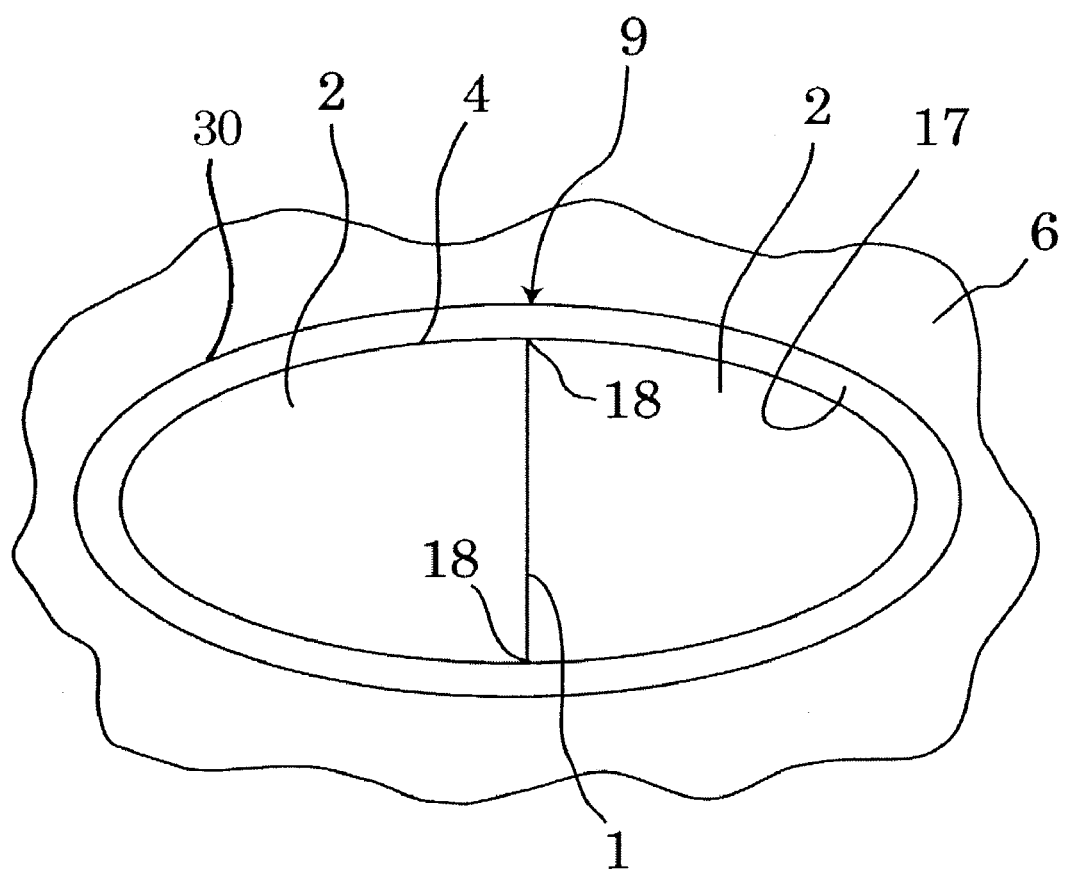
FIG. 32 is a plan view of a safety valve in another example.
Figure 33:
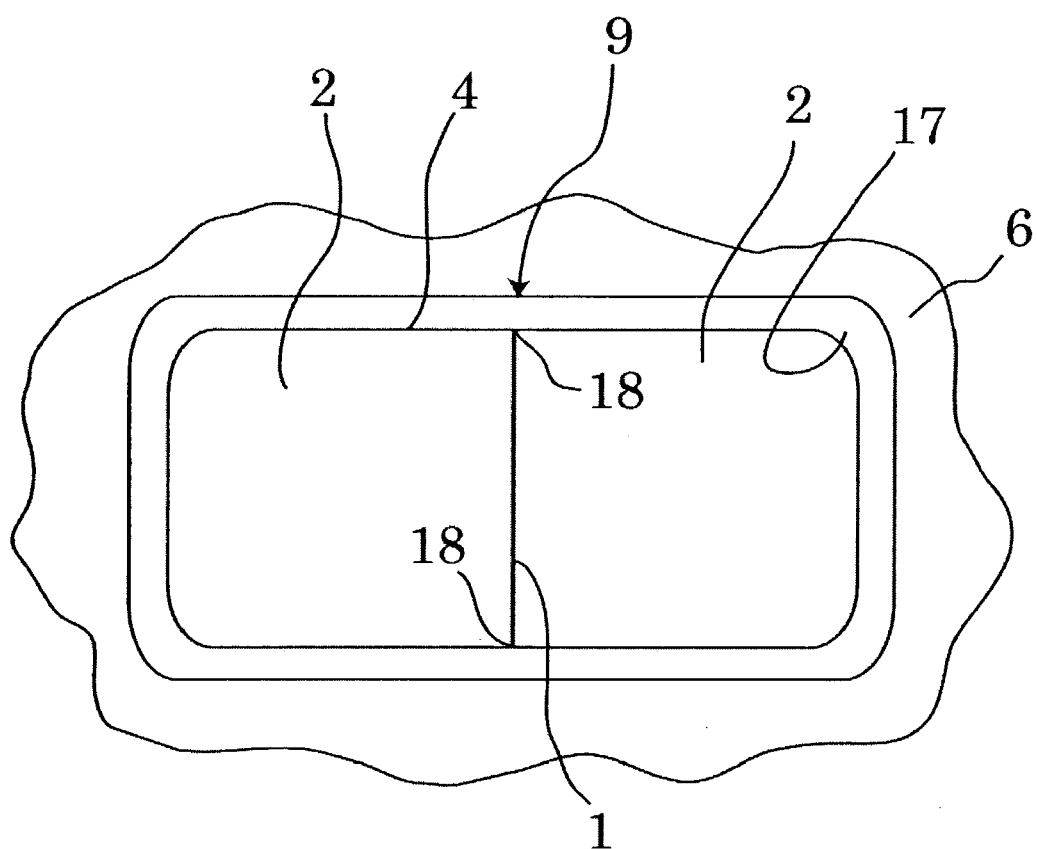
FIG. 33 is a plan view of a safety valve in another example.
Figure 34:
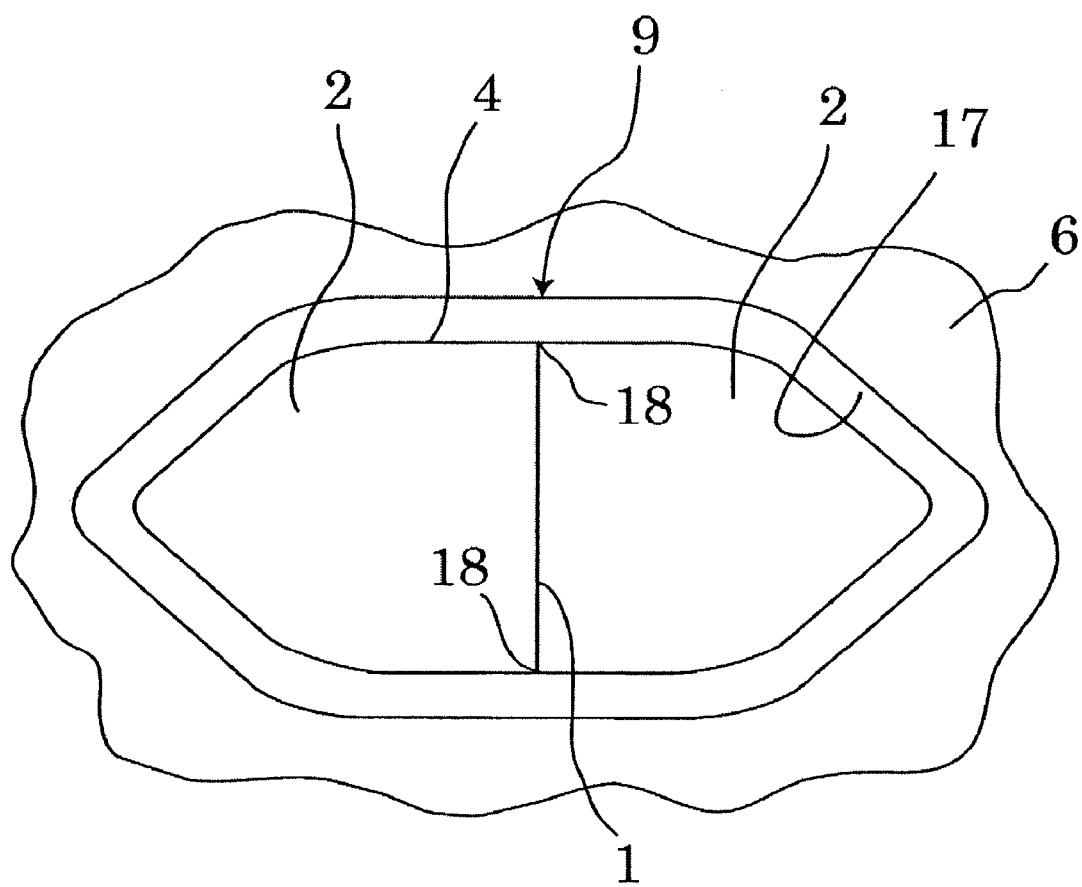
FIG. 34 is a plan view of a safety valve in another example.
Figure 35:
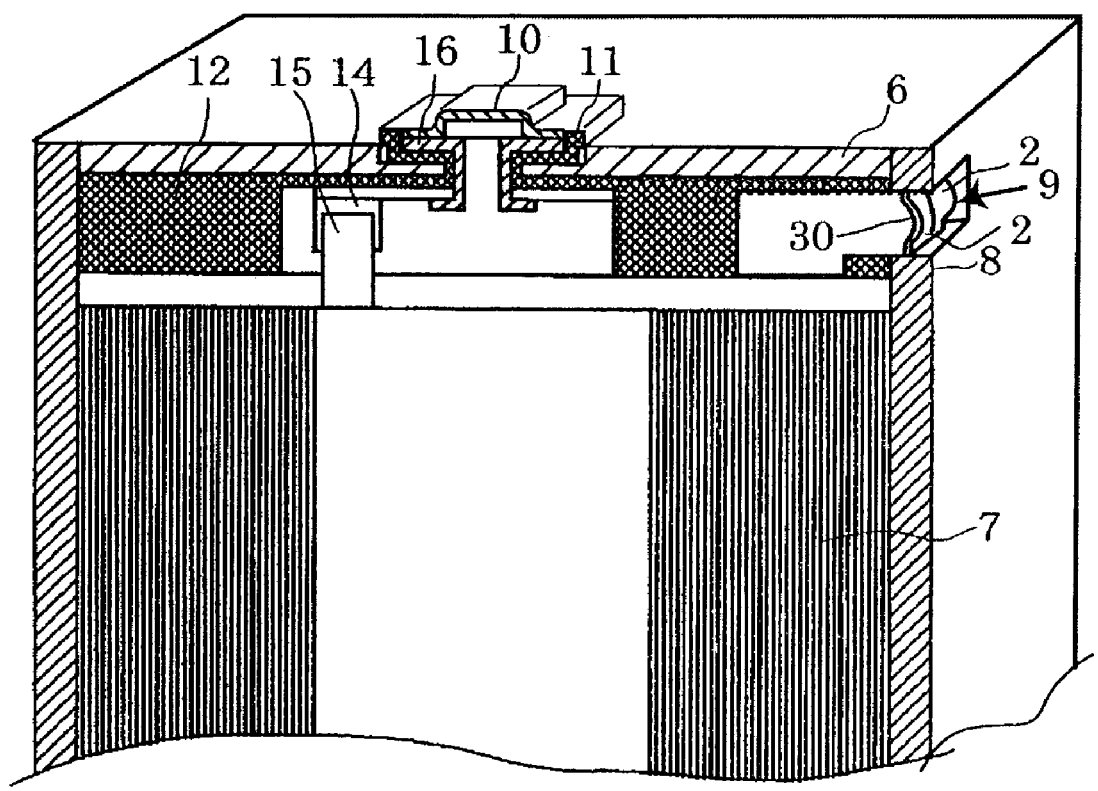
FIG. 35 is a perspective view of a cell provided with a safety valve of another example.
Figure 36:
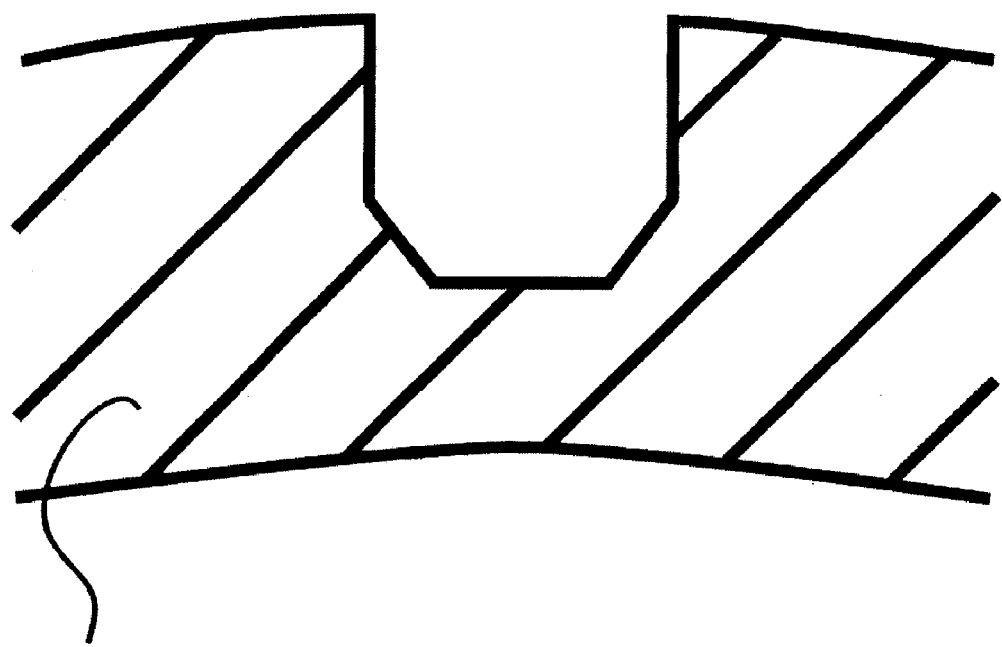
FIG. 36 is a cross sectional view of a groove of another example.
Figure 37:
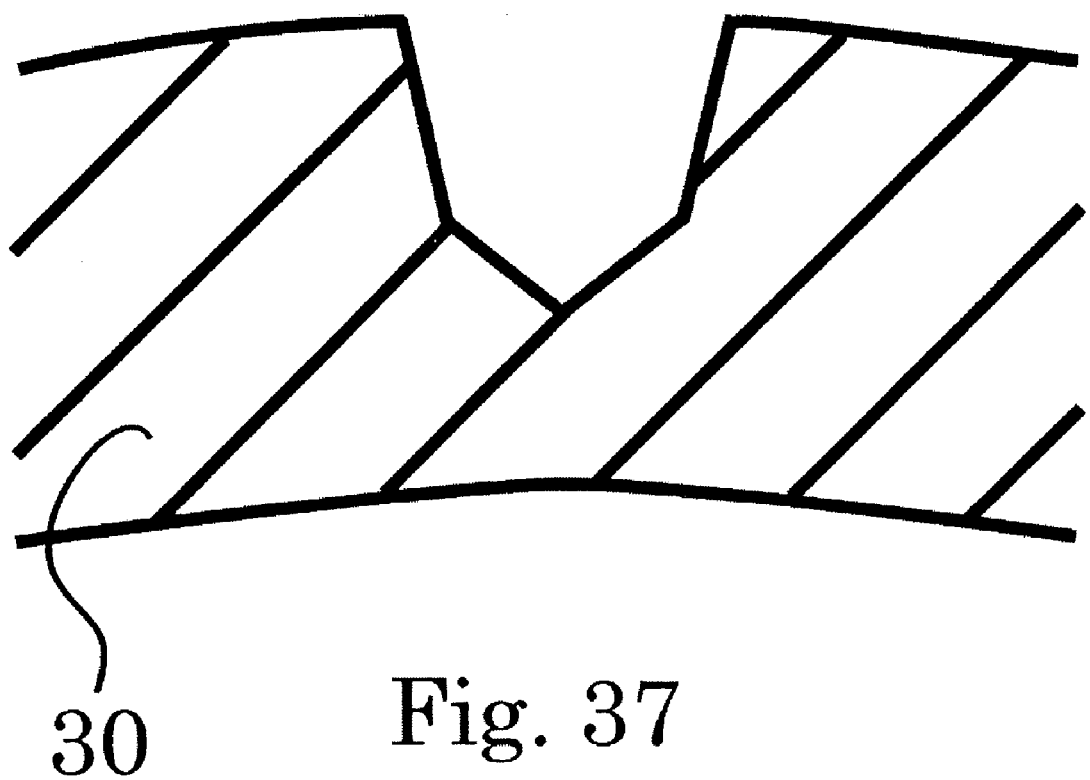
FIG. 37 is a cross sectional view of a groove of another example.
Figure 38:
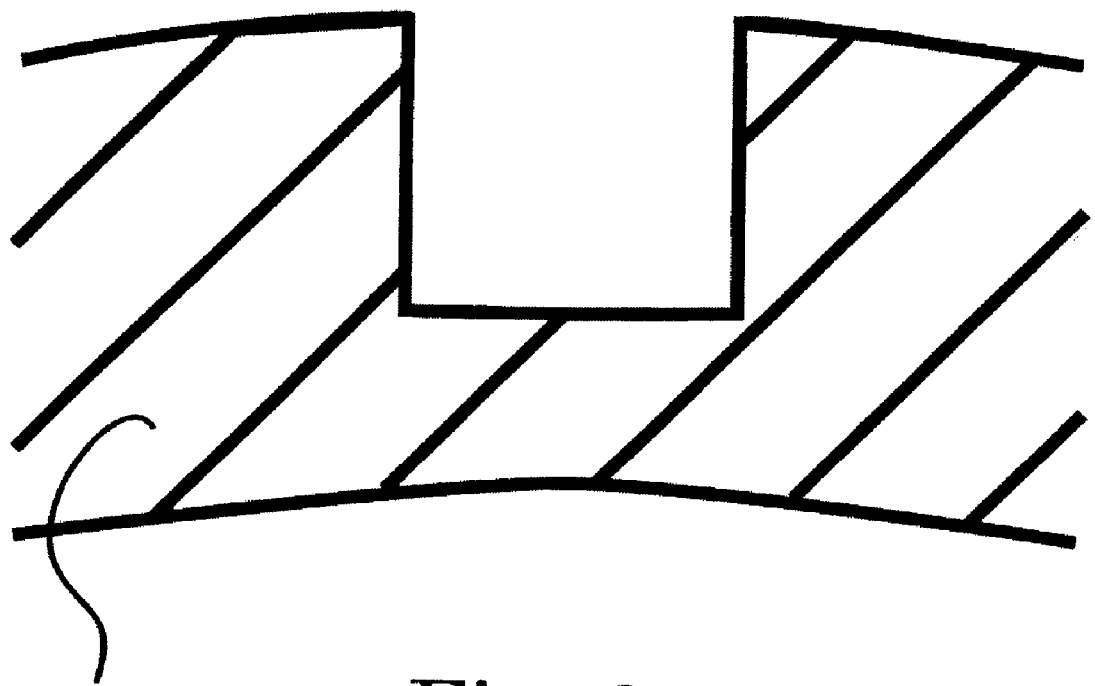
FIG. 38 is a cross sectional view of a groove of another example.
Figure 39:
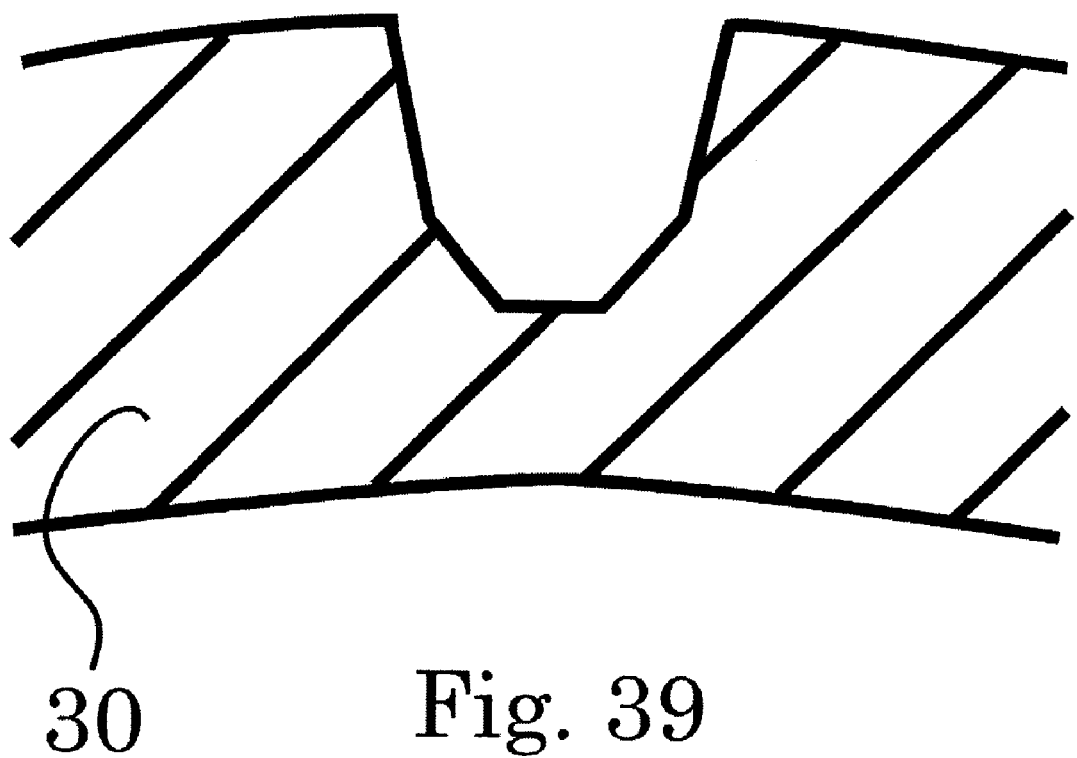
FIG. 39 is a cross sectional view of a groove of another example.

(D) In the above examples, although the break aiding groove 1 is a continuous line, it is not to be limited to such a shape, and it is possible that, for example, the break aiding groove is a curved line or a serration line as shown in FIGS. 26 and 27. In addition, the break aiding groove may be a dotted line (discontinuous line), provided that the break aiding groove is connected with the break groove as shown in FIGS. 28–30. Further, end-edges of the break aiding groove may not necessarily be the intersection points of the break aiding groove and the break groove.

(E) In the above examples, although each of areas divided by the break groove 4 and the break aiding groove 1 is dome-shaped, it is not to be limited to such a shape, and it is possible that, for example, each of the areas is flat as shown in FIG. 11.

However, like the above examples, when each of the areas divided by the break groove 4 and the break aiding groove 1 is dome-shaped, a residual stress utilized for dome-shape forming acts on the break groove 4 effectively at the time of the operation of the safety plate 9. This enables the whole of the break groove 4 to break reliably. In addition, when each of the areas divided by the break groove 4 and the break aiding groove 1 is flat as shown in FIG. 11, the operating pressure of the safety valve 9 is made slightly higher when an internal pressure is applied on the safety valve 9, because the internal pressure to act on the inner area of the break groove 4 acts for the deformation of the safety valve 9 first. Contrarily, when each of the areas divided by the break groove 4 and the break aiding groove 1 is dome-shaped as shown in FIG. 12, the dome portions are hard to deform when an internal pressure is applied on the inner area of the break groove. Therefore, almost all the internal pressure acts as a stress applied on the break groove. Accordingly, when each of the areas divided by the break groove 4 and the break aiding groove 1 is dome-shaped, a larger stress is concentrated on the intersection points 18·18 of the break aiding groove 1 and the break groove 4, thus enabling the safety valve 9 to operate more smoothly. It is recognized from this that when each of the areas divided by the break groove 4 and the break aiding groove 1 is dome-shaped, a gas inside the cell is released more reliably and quickly.

(F) In the above examples, although difference in remaining thickness between the break groove 4 and the break aiding groove 1 is 10 μm, it is not to be limited to this, and provided that difference in remaining thickness between the break groove 4 and the break aiding groove 1 is 5 μm or more, it is possible to obtain the same operation and effect as the above examples.

(G) In the above examples, although the plan of the valve plate or the break groove 4 is oval track-shaped, it is not to be limited to this, and the plan may be a circle, an ellipse-like shape, or polygonal-shaped such as a quadrangle.

The ellipse-like shape includes an oval track, an ellipse, and a rounded square. However, when the plan of the valve plate or the break groove 4 is a quadrangle, although break grooves 4a·4b at portions of the break grooves 4 having intersection points 18·18 of the break groove 4 and the break aiding groove 1 break smoothly as shown in FIG. 13, it is possible that break grooves 4c·4d at portions of the break groove 4 without intersection points 18·18 do not break smoothly, because the breaking of the break grooves 4a·4b stops at corner portions 19. Therefore, it is preferable that the plan of the break groove is a round-cornered annular shape such as an oval track, a circle, an ellipse, and a rounded square as shown in FIGS. 1 and 31–34. Further, when the valve plate has the above-described ellipse-like shape, a stress applied on around the center of longer sides of the ellipse-like shape is higher than a stress applied on other portions when an internal cell pressure rises. This makes the breaking of the valve plate more smooth when an internal cell pressure rises, compared with a round valve plate that almost does not have portion-to-portion stress differences.

(H) In the above examples, although the cross section of the break groove 4 is V-shaped and the cross section of the break aiding groove 1 is U-shaped, it is not to be limited to such shapes provided that the width ($\alpha$) of a bottom portion of the break aiding groove of the valve plate is thicker than the width ($\beta$) of a bottom portion of the break groove of the valve plate ($\alpha > \beta$). For example, it is possible to employ grooves having cross sections shown in FIGS. 36–39.

However, since it is required that the break groove 4 break reliably when an internal cell pressure rises, the section of the break groove 4 preferably is substantially V-shaped to facilitate the breaking thereof. In addition, since it is required to prevent the break aiding groove 1 from breaking when an internal cell pressure rises, the section of the break aiding groove 1 preferably is substantially U-shaped to make it difficult for the break aiding groove 1 to break.

(I) The material of the sealing plate 6 and the safety valve 9 is not limited to an aluminum alloy but may be a pure aluminum, and the present invention is of course not limited in application to the non-aqueous electrolyte cell but to cells provided with the thin safety valve 9.

(J) Portions on which to form the thin safety valve 9 is not limited to the sealing plate 6 but may be other portions of the cell such as the bottom of the outer casing 8 and a side portion of the outer casing 8 as long as the side portion is not in an area below which an electrolyte solution is poured. In addition, in the above examples, although the safety valve 9 is formed by plasticity working the sealing plate 6, the sealing plate 6 and the safety valve 9 are formed of different components and then joined together by welding. In consideration of mass productivity, the safety valve 9 is preferably formed in the manner of the above examples.

(K) When the present invention is applied to the non-aqueous electrolyte cell, as the material of the positive electrode such substances may appropriately be used as, besides the above-mentioned $LiCoO_2$, $LiNiO_2$, $LiMn_2O_4$, or their composite substances such as composite oxides containing lithium. As the material of the negative electrode such substances may be appropriately be used as, besides the above-mentioned carbon materials, lithium metals, lithium alloys, or metal oxides (tin oxides etc.). Further, a solvent of the electrolyte solution is not limited to the above-mentioned substance but may be a mixture obtained by mixing at an appropriate ratio such a solution having a relatively high dielectric constant as propylene carbonate, ethylene carbonate, vinylene carbonate, or γ-butyrolactone and such a solution having a low viscosity and a low boiling point as diethyl carbonate, dimethyl carbonate, methyl-ethyl carbonate, tetra-hydrofuran, 1,2-dimethoxyethane, 1,3-dioxolane, 2-methoxy-tetrahydrofuran, or diethyl-ether. Also, the electrolyte solution may be made of, besides the above-mentioned $LiPF_6$, $LiAsF_6$, $LiClO_4$, $LiBF_4$, $LiCF_3SO_3$, or the like.

What is claimed is:

1. A cell safety valve comprising:
    a valve plate integral with a sealing plate and thinner than the sealing plate,
    a break groove forming an ellipse-shaped closed ring inside and along the periphery of the valve plate, and
    one or more break aiding groove in an inner area of the ellipse-shaped break groove, wherein:

a bottom portion of the break aiding groove of the valve plate is wider than a bottom portion of the ellipse-shaped break groove of the valve plate;

a remaining thickness of the valve plate at the break aiding groove is thicker than a remaining thickness of the valve plate at the ellipse-shaped break groove; and at least one end of the break aiding groove is connected with the ellipse-shaped break groove.

2. The cell safety valve according to claim 1, wherein both ends of the break aiding groove are connected with the ellipse-shaped break groove.

3. The cell safety valve according to claim 1, wherein the break aiding groove passes through a center of the valve plate.

4. The cell safety valve according to claim 1, wherein among two or more areas of the valve plate divided by the ellipse-shaped break groove and the break aiding groove, at least one of the areas is dome-shaped.

5. The cell safety valve according to claim 1, wherein difference in remaining thickness of the valve plate between the ellipse-shaped break groove and the break aiding groove is 5 μm or more.

6. The cell safety valve according to claim 1, wherein:
the sealing plate and the valve are composed of an aluminum alloy; and
the deepest bottom of the break aiding groove is planar shaped.

7. The cell safety valve comprising:
a valve plate integral with a sealing plate and thinner than the sealing plate,
a break groove forming an ellipse-shaped closed ring inside and along the periphery of the valve plate, and
one or more break aiding groove in an inner area of the ellipse-shaped break groove,
wherein:
the sealing plate and the valve are composed of an aluminum alloy;
the deepest bottom of the break aiding groove is planar shaped,
a remaining thickness of the valve plate at the break aiding groove is thicker than a remaining thickness of the valve plate at the ellipse-shaped break groove,
both ends of the break aiding groove are connected with two opposing longitudinal sides of the ellipse-shaped break groove, and
among two or more areas of the valve plate divided by the ellipse-shaped break groove and the break-aiding groove, at least one of the areas is dome-shaped.

8. A cell comprising a positive electrode, a negative electrode, an electrolyte, and an outer casing,
wherein:
the outer casing comprises a sealing plate for sealing the outer casing, a valve plate integral with the sealing plate and thinner than the sealing plate, a break groove forming an ellipse-shaped closed ring inside and along the periphery of the valve plate, and one or more break aiding groove in an inner area of the ellipse-shaped break groove,
a bottom portion of the break aiding groove of the valve plate is wider than a bottom portion of the ellipse-shaped break groove of the valve plate, and a remaining thickness of the valve plate at the break aiding groove is thicker than a remaining thickness of the valve plate at the ellipse-shaped break groove,
both ends of the break aiding groove are connected with two opposing longitudinal sides of the ellipse-shaped break groove, and
among two or more areas of the valve plate divided by the ellipse-shaped break groove and the break-aiding groove, at least one of the areas is dome-shaped.

9. A cell comprising a positive electrode, a negative electrode, an electrolyte, and an outer casing,
wherein:
the outer casing comprises a sealing plate for sealing the outer casing, a valve plate integral with the sealing plate and thinner than the sealing plate, a break groove forming an ellipse-shaped closed ring inside and alone the periphery of the valve plate, and one or more break aiding groove in an inner area of the ellipse-shaped break groove,
the sealing plate and the valve are composed of an aluminum alloy;
a deep bottom of the break aiding groove is flat shaped;
a remaining thickness of the valve plate at the break aiding groove is thicker than a remaining thickness of the valve plate at the ellipse-shaped break groove,
both ends of the break aiding groove are connected with two opposing longitudinal sides of the ellipse-shaped break groove, and
among two or more areas of the valve plate divided by the ellipse-shaped break groove and the break-aiding groove, at least one of the areas is dome-shaped.

* * * * *